(12) United States Patent
Usui et al.

(10) Patent No.: US 6,374,958 B1
(45) Date of Patent: Apr. 23, 2002

(54) MOTOR-DRIVEN DISK BRAKE

(75) Inventors: Takuya Usui; Yukio Ohtani, both of Kanagawa-ken (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/539,316

(22) Filed: Mar. 30, 2000

(30) Foreign Application Priority Data

| Mar. 31, 1999 | (JP) | 11-093790 |
| Apr. 21, 1999 | (JP) | 11-114232 |
| Apr. 21, 1999 | (JP) | 11-114247 |

(51) Int. Cl.[7] .............................................. F16D 55/08
(52) U.S. Cl. ..................... 188/72.7; 188/71.9; 188/72.1; 188/156
(58) Field of Search ............................. 188/72.7, 71.7, 188/71.8, 71.9, 72.1, 156

(56) References Cited

U.S. PATENT DOCUMENTS

| 3,638,763 A | * | 2/1972 | Laverdant | 188/72.6 |
| 3,701,400 A | * | 10/1972 | Burnett et al. | 188/72.6 |
| 3,835,960 A | * | 9/1974 | Moss | 188/71.9 |
| 3,991,859 A | * | 11/1976 | Coulter et al. | 188/71.9 |
| 4,159,754 A | * | 7/1979 | Airheart et al. | 188/71.8 |
| 4,162,720 A | * | 7/1979 | Haraikawa | 188/71.9 |
| 4,390,084 A | * | 6/1983 | Haraikawa | 188/71.7 |
| 4,458,789 A | * | 7/1984 | Cole | 188/71.5 |
| 4,476,965 A | * | 10/1984 | Brown, Jr. et al. | 188/171 |
| 4,653,614 A | * | 3/1987 | Price et al. | 188/70 B |
| 4,658,939 A | | 4/1987 | Kircher et al. | |
| 4,923,036 A | * | 5/1990 | Margetts | 188/72.6 |
| 5,219,048 A | * | 6/1993 | Shaw et al. | 188/72.1 |
| 5,348,123 A | * | 9/1994 | Takahashi et al. | 188/72.1 |
| 5,651,437 A | * | 7/1997 | Organek et al. | 192/35 |
| 5,810,141 A | * | 9/1998 | Organek et al. | 192/35 |
| 5,931,268 A | * | 8/1999 | Kingston et al. | 188/162 |
| 5,971,110 A | * | 10/1999 | Martin | 188/72.1 |
| 6,082,504 A | * | 7/2000 | Organek et al. | 188/72.7 |
| 6,173,820 B1 | * | 1/2001 | Blosch et al. | 188/158 |
| 6,213,256 B1 | * | 4/2001 | Schaffer | 188/71.9 |
| 6,257,377 B1 | * | 7/2001 | Schumann | 188/72.8 |

FOREIGN PATENT DOCUMENTS

| JP | 60-206766 | 10/1985 |
| JP | 9-264351 | 10/1997 |

* cited by examiner

*Primary Examiner*—Christopher P. Schwartz
*Assistant Examiner*—Benjamin A. Pezzlo
(74) *Attorney, Agent, or Firm*—Wenderoth, Lind & Ponack, L.L.P.

(57) ABSTRACT

A motor-driven disk brake has a first brake pad and a second brake pad disposed at opposite sides of a disk rotor, a piston disposed so as to face the first brake pad, a claw portion extending over the disk rotor and facing the second brake pad, and an electric motor disposed in the vicinity of the piston. A ball ramp mechanism for converting rotation of the electric motor to a linear motion is disposed between the first brake pad and the electric motor. When the motor is operated, the piston is reciprocally moved by the ball ramp mechanism, to thereby enable application and removal of a braking force relative to the disk rotor by the brake pads.

17 Claims, 18 Drawing Sheets

MOTOR-DRIVEN DISK BRAKE

BACKGROUND OF THE INVENTION

The present invention relates to a motor-driven disk brake for generating a braking force by means of a torque of an electric motor.

As a brake apparatus for a vehicle, such as an automobile, there has been known a so-called "dry brake" apparatus which generates a braking force by means of an output of an electric motor, without using a brake fluid.

As an example of a dry brake apparatus, there can be mentioned a motor-driven disk brake disclosed in Unexamined Japanese Patent Application Public Disclosure (Kokai) No. 60-206766. In this disk brake, rotation of the motor Is converted to a reciprocating motion of a piston by means of a ball screw mechanism and brake pads are pressed against a disk rotor by the piston, to thereby generate a braking force. In a motor-driven disk brake of this type, a pedal pressure applied to the brake pedal (or an amount of displacement of the brake pedal) is detected by a sensor. A controller controls rotation of the motor according to results of detection by the sensor, to thereby obtain a desired braking force.

In the above-mentioned motor-driven disk brake, it is relatively easy to incorporate servo control, antilock control, traction control and vehicle stability control by using various sensors for detecting the condition of the vehicle. For example, a rotational speed of each vehicle wheel, a speed and an acceleration of the vehicle, a steering angle and a lateral acceleration of the vehicle are detected by the sensors, and rotation of the motor is controlled, based on results of the detection.

However, the above-mentioned conventional motor-driven disk brake utilizing a ball screw mechanism poses the following problems That is, for obtaining a sufficiently large braking force by increasing a thrust of the piston, It is necessary to increase the output of the motor or to increase a transmission ratio of the ball screw mechanism by reducing a lead thereof. However, for increasing the output of the motor, a large motor must be used and power consumption Inevitably becomes high. On the other hand, a reduction in the lead of the ball screw mechanism is limited, depending on the diameters of the balls, so that a sufficiently high transmission ratio is difficult to obtain.

As a countermeasure, it is considered to increase the transmission ratio of the ball screw mechanism by reducing the length of the groove of the ball screw mechanism to a length of less than 1 pitch, so as to set the lead of the ball screw mechanism as being smaller than the diameters of the balls. In this arrangement, however, no circulation of the balls occurs within the groove, so that for obtaining a secure operation of the ball screw mechanism, it is necessary to arrange the balls so as not to fill the groove and provide a space containing no balls. In this case, the thrust is not generated uniformly in the entire groove, so that the load due to a bending moment is generated and the portion for supporting the balls must be high. This leads to problems, such as an increase in weight of the supporting portion and high cost of production. Further, the structure of the ball screw mechanism is special, so that processing cost becomes high.

Further, in the above-mentioned motor-driven disk brake, from the viewpoint of saving the space for Installing the ball screw mechanism and the motor, a floating type caliper is employed so that one brake pad is pressed against the disk rotor by the piston, and the other brake pad Is pressed against the disk rotor by moving the caliper due to a reaction force. Therefore, it is necessary to obtain high rigidity of a portion providing a thrust transmission path from a thrust generating mechanism to a claw portion of the caliper Therefore, the case for the electric motor is required to have a large wall thickness, leading to an increase in weight of the case. Further, in the motor-driven disk brake utilizing a floating type caliper, at the time of removing the braking force, the brake pad on a side of the claw portion does not smoothly return to its original position, so that dragging of the brake pad is likely to occur. Further, a transmission mechanism such as the ball screw mechanism and the electric motor are connected to the caliper body, so that ease in assembling of the transmission mechanism and the motor must be fully considered.

SUMMARY OF THE INVENTION

In view of the above, the present invention has been made. It is an object of the present invention to provide a motor-driven disk brake in which a high transmission ratio can be obtained without generating a high load due to a bending moment and high rigidity of a portion providing a thrust transmission path can also be obtained and which is capable of preventing dragging of the brake pads. It is another object of the present invention to provide a motor-driven disk brake which can be easily assembled.

According to the present invention, there is provided a motor-driven disk brake comprising, a first brake pad and a second brake pad disposed at opposite sides of a disk rotor, a piston disposed so as to face the first brake pad, a claw portion extending over the disk rotor and facing the second brake pad, an electric motor disposed in the vicinity of the piston, and a ball ramp mechanism for converting rotation of the electric motor to a linear motion so as to reciprocally move the piston, to thereby enable application and removal of a braking force relative to the disk rotor by means of the brake pads, the ball ramp mechanism being disposed between the first brake pad and the electric motor.

By this arrangement, the ball ramp mechanism can be disposed in the vicinity of the claw portion Therefore, it is possible to secure sufficient rigidity of a brake case providing a thrust transmission path from the ball ramp mechanism to the claw portion, even when the wall thickness of the brake case is reduced. This leads to a reduction in weight of the disk brake.

According to the present invention, there is also provided a motor-driven disk brake comprising a first brake pad and a second brake pad disposed at opposite sides of a disk rotor, a piston disposed so as to face the first brake pad, a claw portion extending over the disk rotor and facing the second brake pad, an electric motor for rotating a rotor, a first ball ramp mechanism for converting rotation of the rotor to a linear motion so as to reciprocally move the piston, and a second ball ramp mechanism for converting rotation of the rotor to a linear motion so as to reciprocally move the claw portion.

The first and second ball ramp mechanism include, a central disk which rotates with the rotor, the central disk having two end surfaces, a first disk connected to the piston, the first disk being disposed so as to have a surface thereof facing one of the two end surfaces of the central disk, a second disk connected to the claw portion, the second disk being disposed so as to have a surface thereof facing the other of the two end surfaces of the central disk, the surfaces of the central disk and each of the first and second disks facing each other including ball grooves, and balls provided between the ball grooves.

By this arrangement, when the rotor is rotated by the motor, the first and second ball ramp mechanisms move the piston and the claw portion, respectively, to thereby enable the brake pads to be pressed against and removed from the disk rotor so as to apply and remove or release a braking force. In this instance, a thrust is uniformly transmitted by means of the balls provided between the ball grooves in the central disk and the first and second disks of the first and second ball ramp mechanisms.

Further, the present invention provides a motor-driven disk brake comprising a first brake pad and a second brake pad disposed at opposite sides of a disk rotor, a piston provided in a caliper body so as to face the first brake pad, a claw portion fixed to the caliper body and extending over the disk rotor so as to face the second brake pad, an electric motor provided in the caliper body, and a ball ramp mechanism for converting rotation of a rotor of the electric motor to a linear motion so as to reciprocally move the piston.

The ball ramp mechanism comprises a fixed disk disposed between the disk rotor and the electric motor and fixed to the caliper body, a movable disk disposed between the disk rotor and the fixed disk and connected to the piston, the movable disk having a surface thereof facing a surface of the fixed disk, and balls provided between ball grooves formed in the surfaces of the movable disk and fixed disk facing each other, the movable disk extending through the fixed disk and being connected to the rotor of the electric motor.

By this arrangement, when the rotor is rotated by the motor, the movable disk of the ball ramp mechanism moves the piston and presses one brake pad against the disk rotor, and the claw portion presses the other brake pad against the disk rotor due to a reaction force, thereby generating a braking force. In this arrangement, the ball ramp mechanism can be disposed in the vicinity of the disk rotor, making it possible to secure sufficient rigidity of a brake case providing a thrust transmission path from the ball ramp mechanism to the claw portion, even when the wall thickness of the brake case is reduced.

Still further, the present invention provides a motor-driven disk brake for applying and removing a braking force relative to a disk rotor by moving a pair of brake pads disposed at opposite sides of the disk rotor. The motor-driven disk brake comprises a caliper body, an electric motor provided in the caliper body, and a ball ramp unit connected to the caliper body, the ball ramp unit being adapted to move the brake pads by receiving power of the electric motor.

The caliper body includes a case for covering the electric motor, and a claw portion extending from the case over the disk rotor so as to face one of the pair of brake pads.

The ball ramp unit includes a piston facing the other of the pair of brake pads, a ball ramp mechanism for converting rotation of a rotor of the electric motor to a linear motion so as to reciprocally move the piston, the ball ramp mechanism including a fixed disk which is fixed to the caliper body by connecting the ball ramp unit to the caliper body, a movable disk connected to the piston and balls provided between the fixed disk and the movable disk, and a case for covering the fixed disk and movable disk in a circumferential direction thereof so as to accommodate the piston and the ball ramp mechanism as a unit.

Thus, the fixed disk, the movable disk and the balls of the ball ramp mechanism are accommodated in the case as a unit, so as to provide the ball ramp unit. Therefore, the disks and balls can be easily connected to the caliper body.

In this motor-driven disk brake, a pad wear compensating mechanism may be connected integrally to the ball ramp unit. By this arrangement, the pad wear compensating mechanism can be connected to the caliper body, together with the ball ramp mechanism.

Still further, the present invention provides a motor-driven disk brake comprising a first brake pad and a second brake pad disposed at opposite sides of a disk rotor, a piston provided in a caliper body so as to face the first brake pad, a claw portion fixed to the caliper body and extending over the disk rotor so as to face the second brake pad, an electric motor provided in the caliper body, and a transmission mechanism for converting rotation of a rotor of the electric motor to a linear motion so as to reciprocally move the piston. The rotor of the electric motor and the transmission mechanism are connected through the claw portion by assembling the transmission mechanism as a subunit, connecting the transmission mechanism to the inside of the claw portion and connecting the electric motor to the outside of the claw portion.

Thus, in the above-mentioned motor-driven disk brake, the transmission mechanism is assembled as a subunit. Therefore, the transmission mechanism can be easily connected to the caliper body. In addition, by connecting the transmission mechanism to the inside of the claw portion, the thrust from the transmission mechanism can be directly transmitted through the claw portion to the brake pads.

Still further, the present invention provides a motor-driven disk brake for applying and removing a braking force relative to a disk rotor by moving a pair of brake pads disposed at opposite sides of the disk rotor. The motor-driven disk brake comprises a piston facing one of the pair of brake pads, a claw portion extending over the disk rotor so as to face the other of the pair of brake pads, an electric motor spaced apart from the claw portion and disposed in the vicinity of an end portion of the piston, and a ball ramp mechanism for converting rotation of the electric motor to a linear motion so as to reciprocally move the piston, to thereby enable application and removal of a braking force relative to the disk rotor by means of the brake pads, the ball ramp mechanism being disposed between the claw portion and the electric motor.

Still further, the present invention provides a motor-driven disk brake for applying and removing a braking force relative to a disk rotor by moving a first brake pad and a second brake pad disposed at opposite sides of the disk rotor. The motor-driven disk brake comprises a motor mechanism portion, and a power transmission mechanism portion connected to the motor mechanism portion, the power transmission mechanism portion being adapted to move the brake pads by receiving power from the motor mechanism portion. The motor mechanism portion includes an electric motor and first case for covering the electric motor. The power transmission mechanism portion comprises a claw portion including a flange portion having an opening and a ball ramp unit inserted into the opening of the flange portion.

The ball ramp unit includes a piston disposed so as to face the first brake pad, a ball ramp mechanism for converting rotation of a rotor of the electric motor to a linear motion so as to reciprocally move the piston, and a second case for accommodating the piston and the ball ramp mechanism as a unit.

The claw portion is capable of extending over the disk rotor and facing the second brake pad when the ball ramp unit is inserted into the opening of the flange portion. The motor-driven disk brake further comprises a transmission device for transmitting power of the electric motor of the motor mechanism portion to the ball ramp mechanism of the power mechanism portion when the power transmission mechanism portion and the motor mechanism portion are connected by engaging the first case with the claw portion.

The foregoing and other objects, features and advantages of the present invention will be apparent from the following detailed description and appended claims taken in connection with the accompanying drawings.

DETAILED DESCRIPTION OF THE INVENTION

Hereinbelow, embodiments of the present invention are described in detail, with reference to the accompanying drawings.

Figure 1:
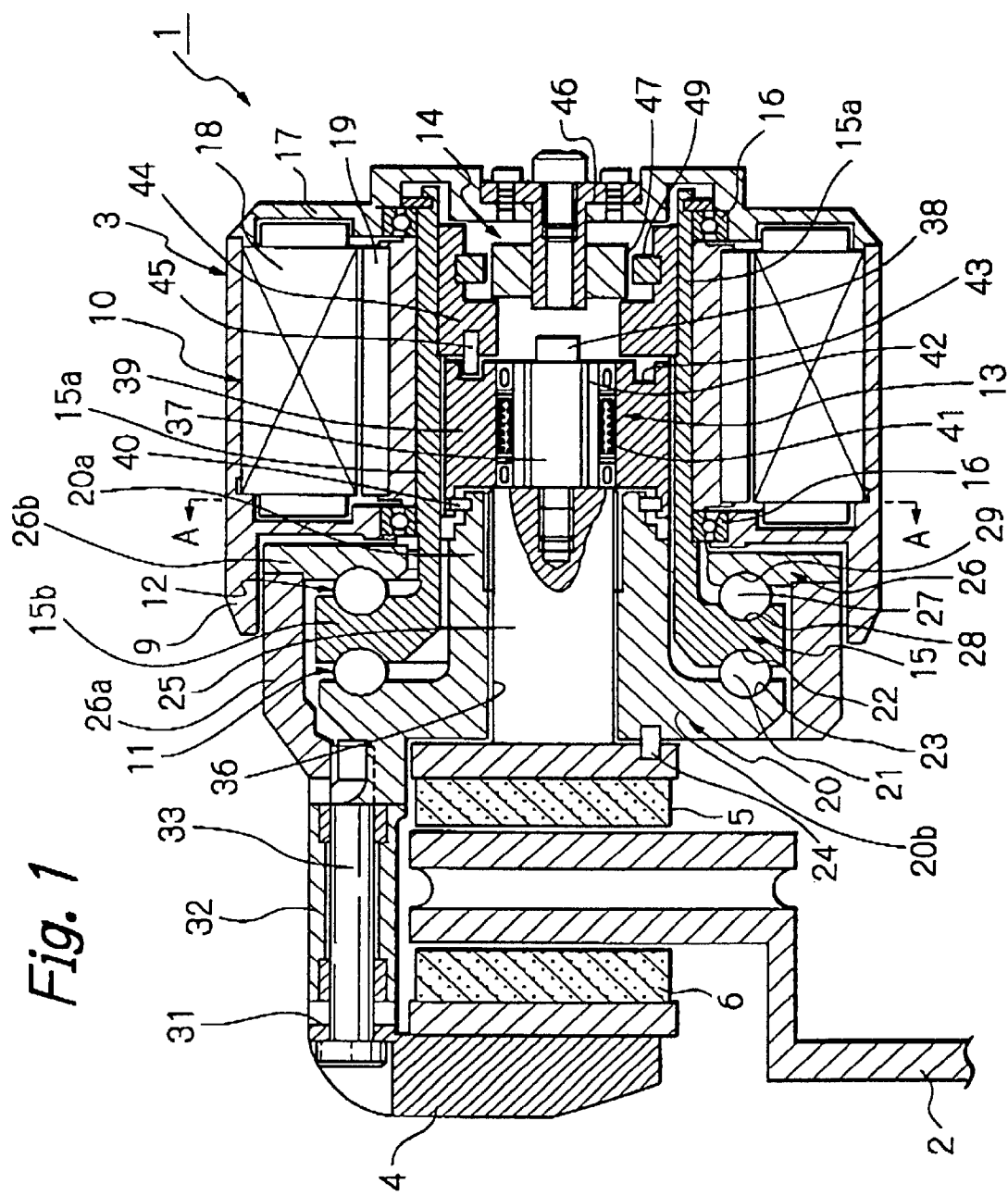
FIG. 1 is a vertical cross-sectional view of a motor-driven disk brake according to a first embodiment of the present invention.
Figure 2:
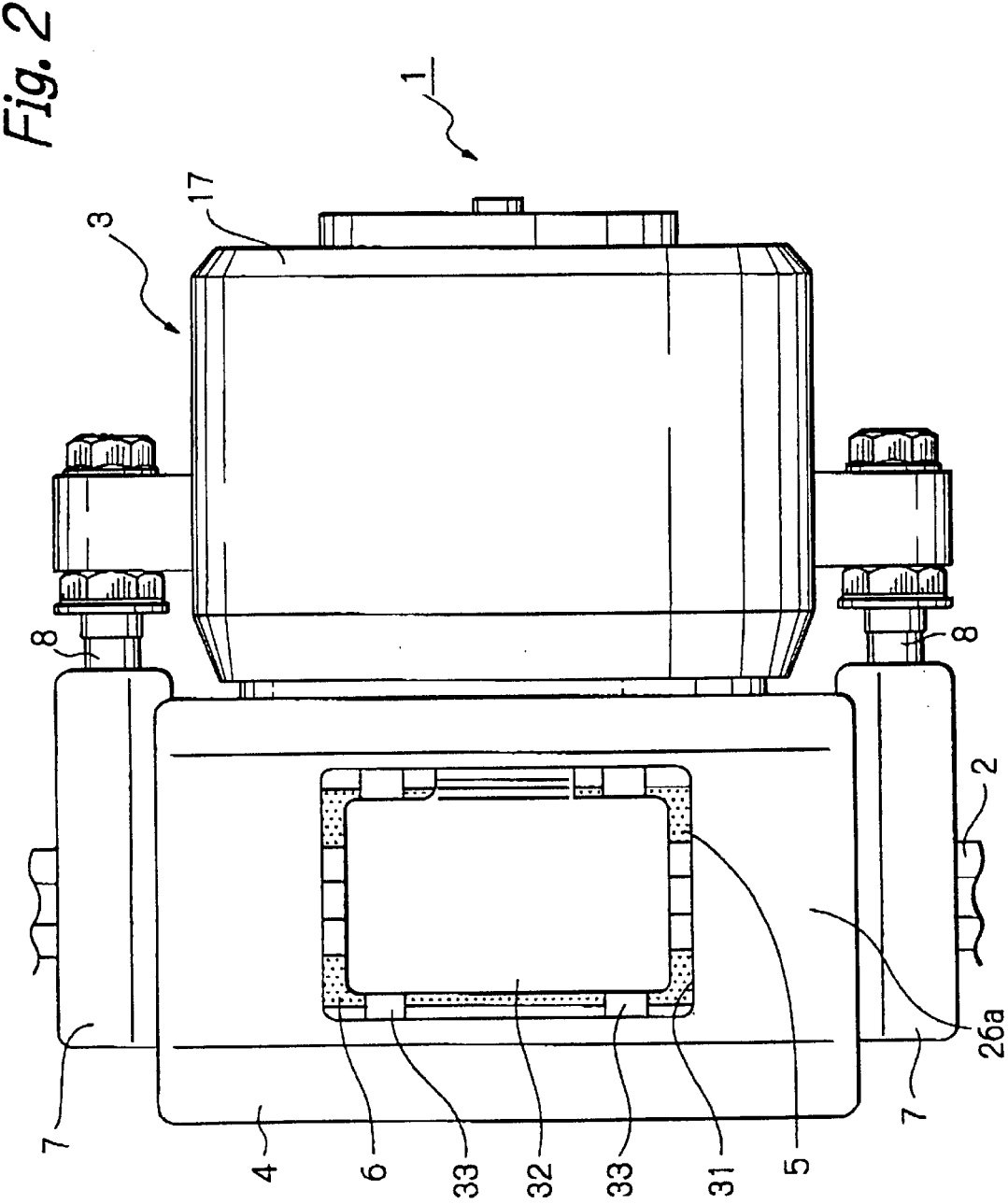
FIG. 2 is a plan view of the disk brake of FIG. 1.
Figure 3:
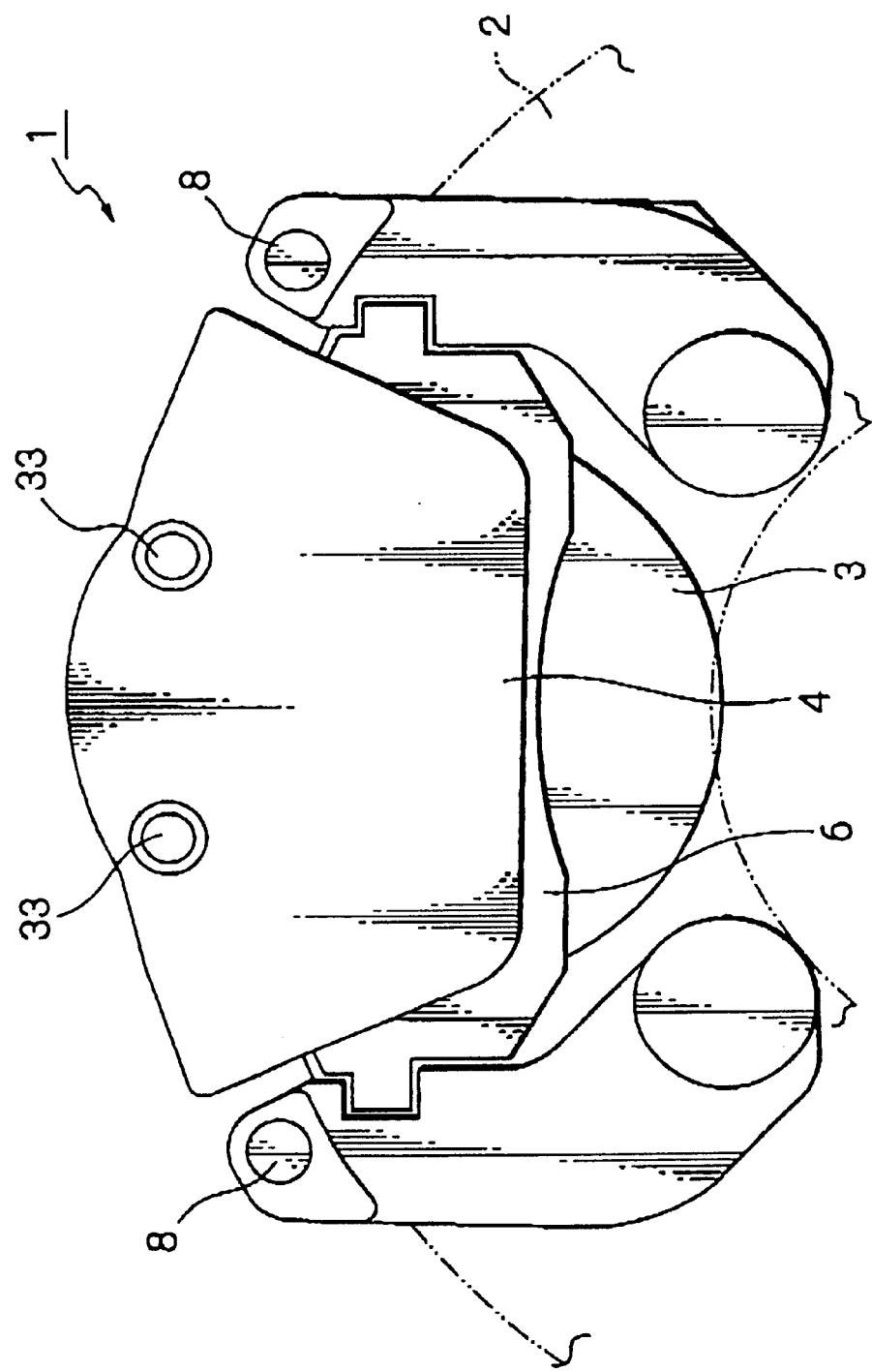
FIG. 3 is a side view of the disk brake of FIG. 1.

A first embodiment of the present invention is described, with reference to FIGS. 1 to 12D. As shown in FIGS. 1 to 3, in a motor-driven disk brake 1 In this embodiment, a caliper body 3 is disposed at one side of a disk rotor 2 (generally inwardly relative to a vehicle body) which rotates with a vehicle wheel. A claw portion 4 extends from the caliper body 3 over the disk rotor 2. Brake pads 5 and 6 are disposed at opposite sides of the disk rotor 2, that is, between the disk rotor 2 and the caliper body 3 and between the disk rotor 2 and the claw portion 4, respectively. The brake pads 5 and 6 are supported by. a carrier 7 fixed to the vehicle body, so as to be movable along the axis of the disk rotor 2. The caliper body 3 is guided by slide pins 8 provided in the carrier 7, so as to be movable along the axis of the disk rotor 2.

The caliper body 3 comprises a generally cylindrical housing 9 in which an electric motor 10, a first ball ramp mechanism 11, a second ball ramp mechanism 12, a pad wear compensating mechanism 13, a rotation detector 14 (e.g., a resolver) and a central disk 15 are provided. The central disk 15 comprises a cylindrical portion 15a and a flange portion 15b formed integrally with each other. The central disk 15 is rotatably supported by a ball bearing 16. A cover 17 is attached to a rear end portion of the housing 9.

The motor 10 comprises a stator 18 fixed to an inner circumferential surface of the housing 9 and a rotor 19 attached to an outer circumferential surface of the cylindrical portion 15a of the central disk 15 so as to face an inner circumferential surface of the stator 18. The motor 10 rotates the rotor 19 by a desired angle by generating a desired torque in response to a control signal (an electric signal) from a controller (not shown).

The first ball ramp mechanism 11 comprises the central disk 15, a first disk 20 and balls 21 (made of steel) provided between the central disk 15 and the first disk 20. The first disk 20 comprises a cylindrical portion 20a and a flange portion 20b formed integrally with each other. The cylindrical portion 20a of the first disk 20 is provided in the cylindrical portion 15a of the central disk 15 so that the flange portion 20b faces one end surface of the flange portion 15b of the central disk 15.

Figure 4:
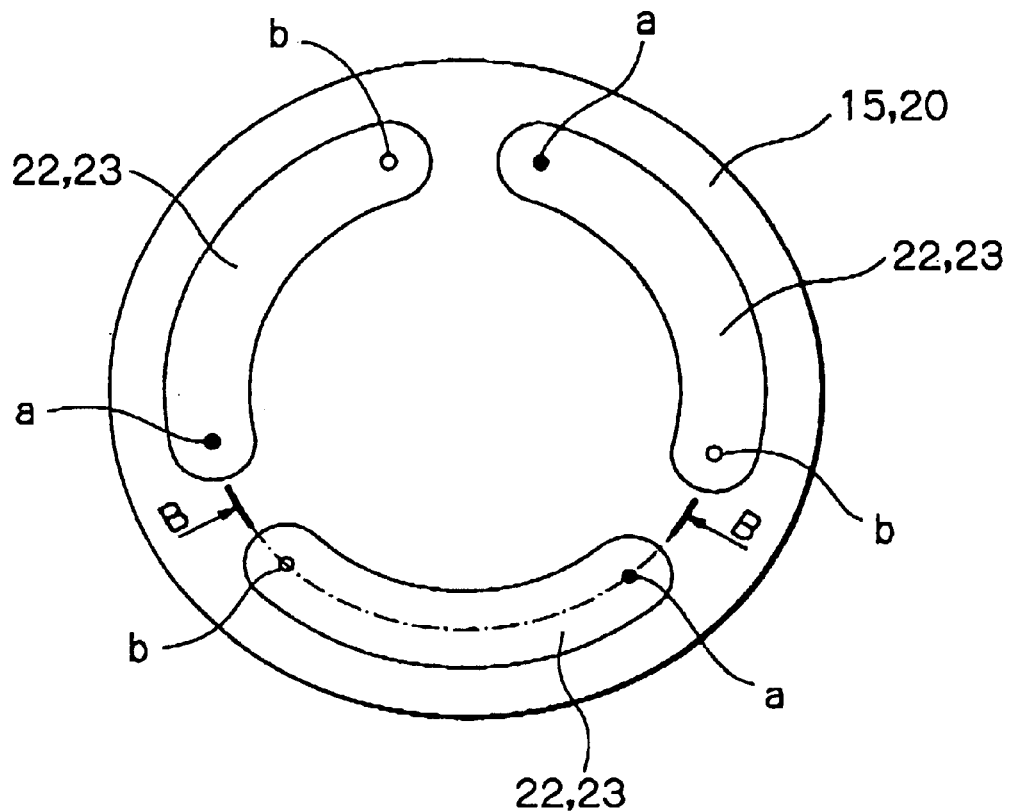
FIG. 4 is a front view showing an arrangement of all grooves of a first ball ramp mechanism of the disk rake of FIG. 1.
Figure 5:
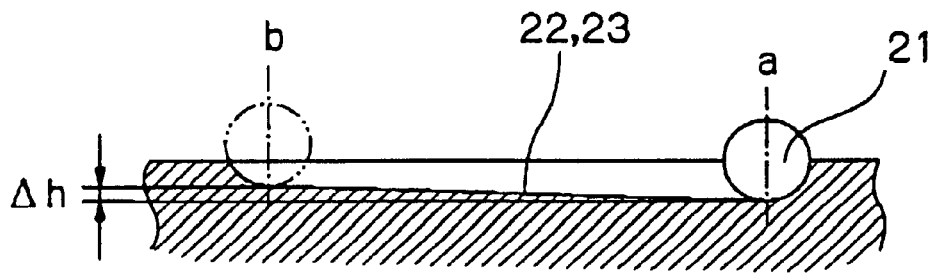
FIG. 5 is a cross-sectional view of the ball groove, taken along the line B—B in FIG. 4.

Each of the opposed surfaces of the central disk 15 and the first disk 20 include ball grooves, each extending in an arc form in a circumferential direction of the disks. In FIG. 4, the surface of the central disk 15 facing the first disk 20 Includes three ball grooves 22 and the surface of the first disk 20 facing the central disk 15 includes three ball grooves 23. The ball grooves in each disk have the same central angle (e.g., 90°) and are disposed in an equally spaced relationship. As shown in FIG. 5, each ball groove has an inclined bottom surface the height of which is the minimum at one end portion thereof (the deepest portion a) and is the maximum at the other end portion thereof (the shallowest portion b). A difference in height between the deepest portion a and the shallowest portion b is indicated by Δh. The ball grooves in each disk are arranged so that the respective bottom surfaces thereof are inclined in the same direction. At an original position of the ball grooves 22 of the disk 15 and the ball grooves 23 of the disk 20, the respective deepest portions a of the ball grooves 22 and 23 face each other with the balls 21 being provided therebetween. By this arrangement, when the central disk 15 rotates relative to the first disk 20, the balls 21 roll within the ball grooves 22 and 23 toward the shallowest portions b, to thereby move the first disk 20 away from the central disk 15 in an axial direction thereof according to an angle of rotation of the central disk 15.

A back plate of the brake pad 5 and the first disk accommodate a pin 24 which restricts rotation thereof When the central disk 15 rotates in a clockwise direction (in this embodiment, "clockwise direction" means the clockwise direction as viewed from the right side of FIG. 1), the first disk 20 moves in a leftward direction in FIG. 1 and enables a piston 25 (described later) attached to the first disk 20 to press the brake pad 5 against the disk rotor 2.

The second ball ramp mechanism 12 comprises the central disk 15, a second disk 26 and balls 27 (made of steel) provided between the central disk 15 and the second disk 26. The second disk 26 comprises a cylindrical portion 26a and a flange portion 26b formed integrally with each other. The flange portion 26b of the second disk 26 is disposed so as to face the other end surface of the flange portion 15b of the central disk 15 and the cylindrical portion 26a is disposed so as to surround the central disk 15 and the first disk 20.

Figure 6:
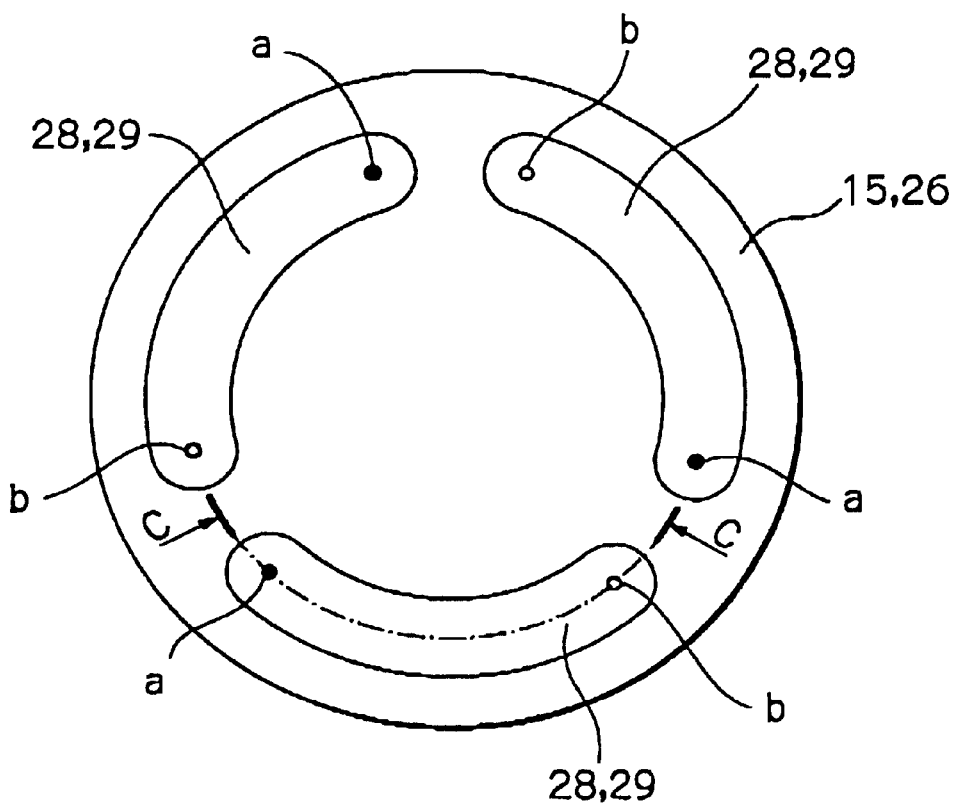
FIG. 6 is a front view showing an arrangement of ball grooves of a second ball ramp mechanism of the disk brake of FIG. 1.
Figure 7:
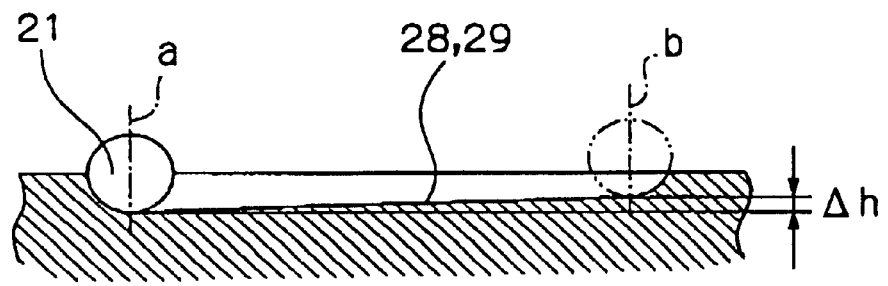
FIG. 7 is a cross-sectional view of the ball groove, taken along the line C—C in FIG. 6.

Each of the opposed surfaces of the central disk 15 and the second disk 26 include ball grooves, each extending in an arc form in a circumferential direction of the disks. In FIG. 6, the surface of the central disk 15 facing the second disk 26 includes three ball grooves 28 and the surface of the second disk 26 facing the central disk 15 includes three ball grooves 29. As in the case of the first ball ramp mechanism 11, the ball grooves in each disk have the same central angle (e.g., 90°) and are disposed in an equally spaced relationship. As shown in FIG. 7, each ball groove has an inclined bottom surface the height of which is the minimum at one end portion thereof (the deepest portion a) and is the maximum at the other end portion thereof (the shallowest portion b). A difference in height between the deepest portion a and the shallowest portion b is indicated by Δh. The ball grooves in each disk are arranged so that the respective bottom surfaces thereof are inclined in the same direction. At an original position of the ball grooves 28 of the disk 15 and the ball grooves 29 of the second disk 26, the respective deepest portions a of the ball grooves 28 and 29 face each other with the balls 27 being provided therebetween. By this arrangement, when the central disk 15 rotates relative to the second disk 26, the balls 27 roll within the ball grooves 28 and 29 toward the shallowest portions b, to thereby move the second disk 26 away from the central disk 15 in the axial direction thereof according to the angle of rotation of the central disk 15.

The claw portion 4 is formed integrally with the cylindrical portion 26a of the second disk 26. The first disk 20 includes a guide portion 32 extending therefrom. At an outer periphery of the disk rotor 2, the guide portion 32 is provided in an opening 31 formed in the claw portion 4. A pair of slide pins 33 thread ably engaged with the claw portion 4 slidable extend through the guide portion 32. The first disk 20 and the claw portion 4 and second disk 26 are guided so as to be movable relative to each other along the axis of the disk rotor 2, while relative rotation between the first disk 20 and the claw portion 4 and second disk 26 is restricted. When the central disk 15 rotates from its original position in the clockwise direction, the second disk 26 moves in a rightward direction in FIG. 1 and enables the claw portion 4 to press the brake pad 6 against the disk rotor 2. It should be noted that the first disk 20 and the second disk 26 are biased toward the central disk 15 by return spring means (not shown).

Next, explanation is made on the pad wear compensating mechanism 13. The piston 25 is thread ably engaged with an adjusting threaded portion 36 in an inner circumferential surface of the cylindrical portion 20a of the first disk 20. The piston 25 is adapted to advance toward the brake pad 5 when rotated in a counterclockwise direction (in this embodiment, "counterclockwise direction" means the counterclockwise direction as viewed from the right side of FIG. 1). A solid, cylindrical sliding member 37 and a rear end portion of the piston 25 are coaxially connected as a unit by a bolt 38. A rear end portion of the first disk 20 is connected, by leaf springs 40, to a generally cylindrical pivotal member 39 which is rotatably provided in the central disk 15. The sliding member 37 is provided within the pivotal member 39. The sliding member 37 is fitted into the pivotal member 39 with a one-way clutch 41 being provided therebetween.

Figure 8:
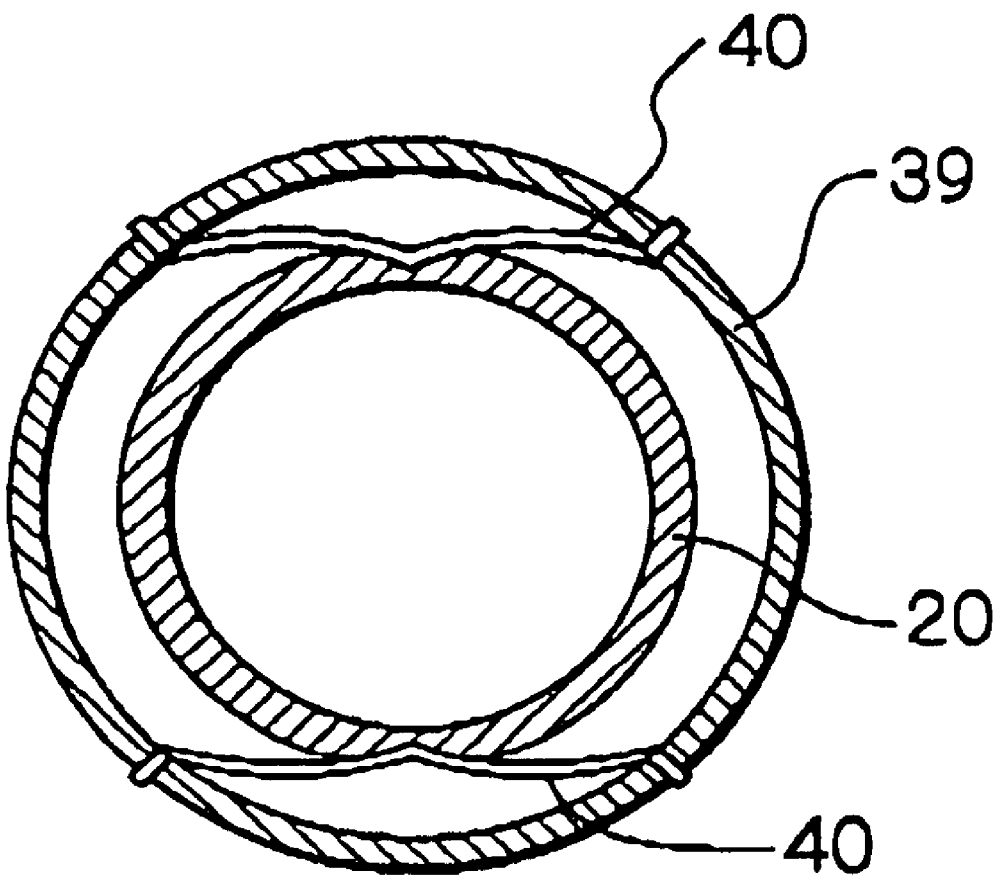
FIG. 8 is a vertical cross-sectional view of a cylindrical portion of a first disk and a pivotal member, taken along the line A—A in FIG. 1.

As shown in FIG. 8, the pivotal member 39 is positioned relative to the first disk 20, while being resiliently biased by the leaf springs 40 in a direction of rotation. Deflection of the leaf springs 40 permits predetermined rotation of the pivotal member 39 relative to the first disk 20. The one-way clutch 41 allows the pivotal member 39 to rotate relative to the sliding member 37 only in the clockwise direction and allows the pivotal member 39 and the sliding member 37 to rotate as a unit in the counterclockwise direction. The sliding member 37 is connected to the one-way clutch 41 by splines 42 so as to be axially movable relative to the pivotal member 39 and the one-way clutch 41.

In a rear end surface of the pivotal member 39, an arcuate engaging groove 43 having a predetermined central angle is formed so as to extend in a circumferential direction of the pivotal member 39. A generally cylindrical retainer 44 is provided within the central disk 15 so as to face a rear end portion of the pivotal member 39. The retainer 44 has an engaging pin 45 attached thereto, which Is inserted into the engaging groove 43 of the pivotal member 39. When relative rotation between the central disk 15 and the first disk 20 occurs in a predetermined range, the engaging pin 45 moves within the engaging groove 43. When the relative rotation between the central disk 15 and the first disk 20 exceeds the predetermined range, the engaging pin 45 abuts against an end portion of the engaging groove 43 and rotates the pivotal member 39. Thus, the engaging groove 43 and the engaging pin 45 provide a transmission mechanism for transmitting only rotational displacement of the central disk 15 exceeding the predetermined range.

The rotation detector 14 is adapted to detect rotational displacement of the central disk 15, that is, rotational displacement of the rotor 19 of the motor 10, based on an electromotive force or an output frequency generated according to rotation of a rotatable member 49 relative to a fixed member 47. The fixed member. 47 is attached to a bracket 46 connected to the cover 17, and the rotatable member 49 is attached to the retainer 44 50 as to radially face the fixed member 47.

Next, explanation is made below on an operation of the motor-driven disk brake in the first embodiment.

In order to generate a braking force, the rotor 19 of the motor 10 and the central disk 15 rotate in the clockwise direction in response to the control signal from the controller (not shown), so that the balls 21 of the first ball ramp mechanism 11 and the balls 27 of the second ball ramp mechanism 12 roll within the ball grooves 22 and 23 and the ball grooves 28 and 29, respectively, to thereby move the first disk 20 and the second disk 26 in opposite directions along the axis of the central disk 15 (thus moving the first and second disks 20 and 26 away from the central disk 15). Thus, the piston 25 and the claw portion 4 press the brake pads 5 and 6 against the disk rotor 2, thereby generating a braking force. The torque acting on the brake pads 5 and 6 is supported by the carrier 7 and the caliper body 3 is slidably moved by the slide pins 8 of the carrier 7. Therefore, deflection of the sliding surfaces of the disk rotor 2 or an error in the clearance provided between the disk rotor 2 and each of the brake pads 5 and 6 before operation of the brake (which clearance determines the position of each brake pad at the time of starting the operation of the brake) can be compensated for. The braking force can be controlled according to rotational displacement of the central disk detected by the rotation detector 14.

Figure 9:
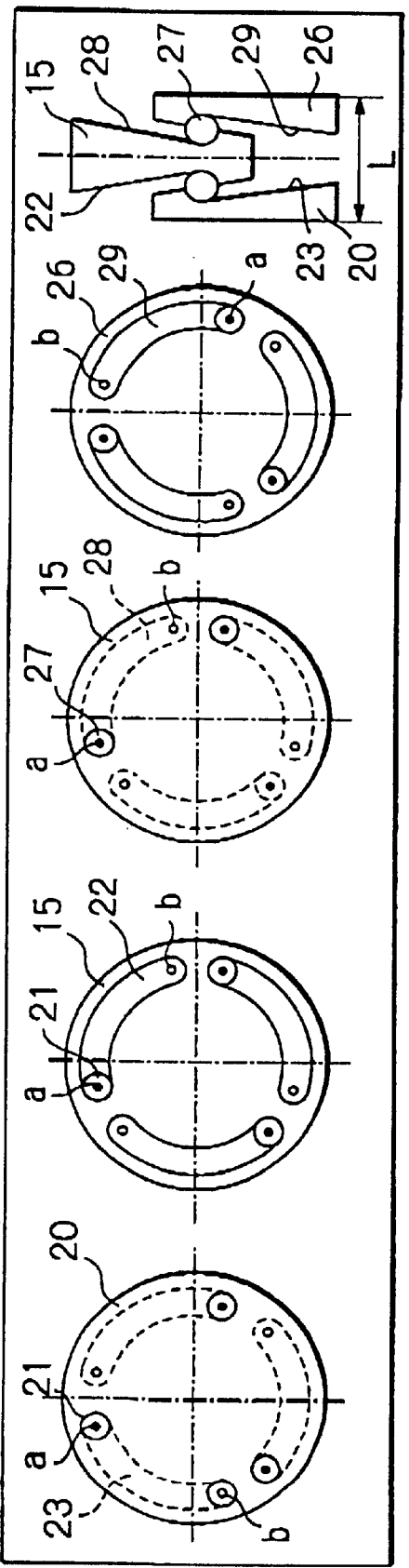
FIG. 9 is a view showing an axial displacement of the first and second disks and positions of the ball grooves and balls when an angle of rotation of a central disk is 0°.
Figure 10:
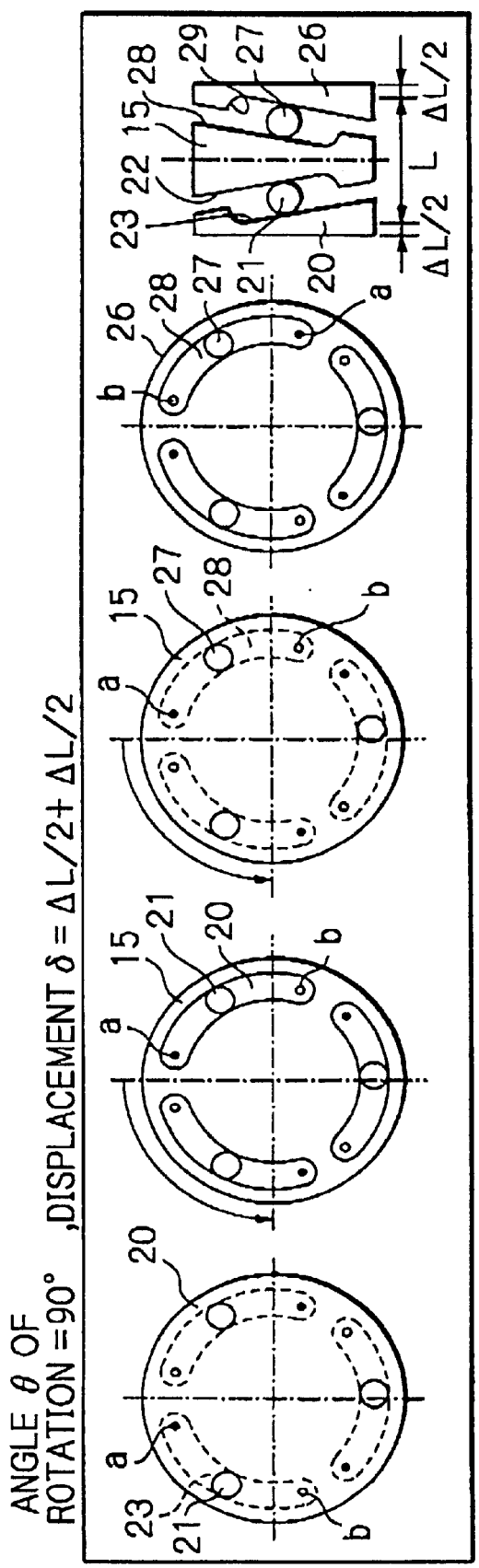
FIG. 10 is a view showing an axial displacement of the first and second disks and positions of the ball grooves and balls when the angle of rotation of the central disk is 90°.
Figure 11:
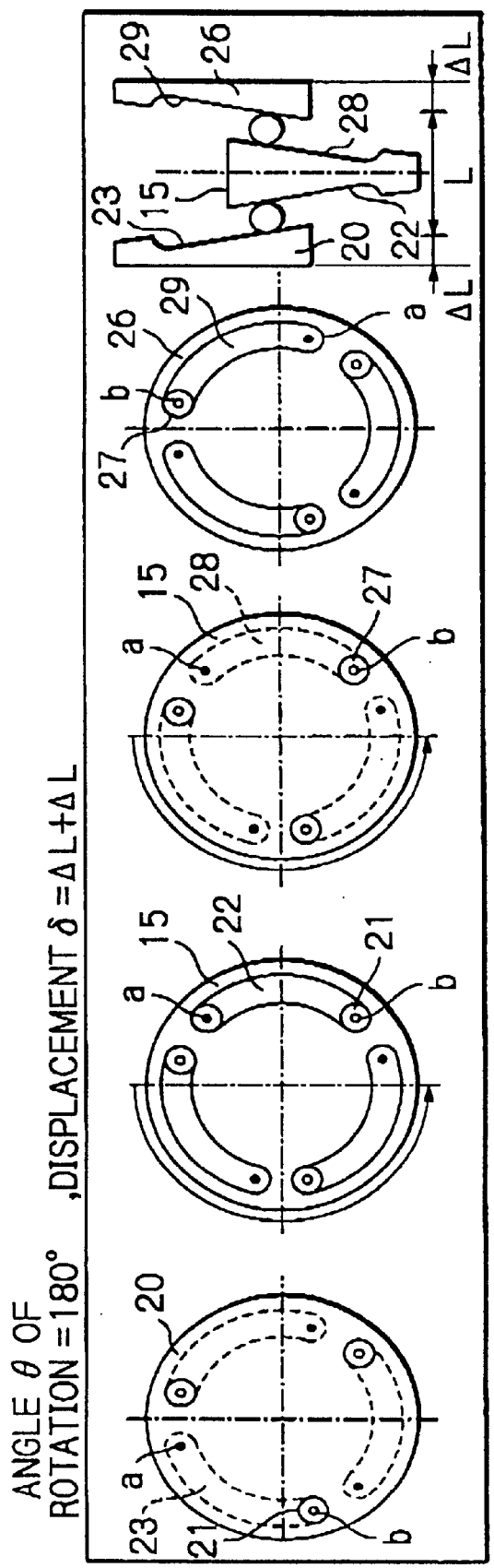
FIG. 11 is a view showing an axial displacement of the first and second disks and positions of the ball grooves and balls when the angle of rotation of the central disk is 180°.

FIGS. 9 to 11 show the relationship between the angle θ of rotation of the central disk 15 and both the axial displacement 6 of the first and second disks 20 and 26 and the positions of the balls 21 and 27. FIG. 9 shows a state of the disks and balls when the rotation angle θ of the central disk 15 is 0° and the axial displacement δ of the first and second disks 20 and 26 is zero. FIG. 10 shows the state when the rotation angle θ of the central disk 15 is 90° and the axial displacement δ of the first and second disks 20 and 26 is ΔL/2+ΔL/2. FIG. 11 shows the state when the rotation angle θ of the central disk 15 is 180° (a maximum angle of rotation) and the axial displacement δ of the first and second disks 20 and 26 is ΔL+ΔL (a maximum displacement).

As shown in FIGS. 9 to 11, the rotation of the central disk 15 is converted to a linear motion by the first and second ball ramp mechanisms 11 and 12. By reducing the inclination of the bottom surfaces of the ball grooves 22 and 23 and ball grooves Z8 and 29, a sufficiently small lead can be obtained relative to the rotational displacement of the central disk 15. Therefore, a high transmission ratio can be obtained and a large output of the motor 10 becomes unnecessary. This leads to a reduction in power consumption and a reduction In size of the motor.

As mentioned above, each of the opposed surfaces of the disks includes three ball grooves which are arranged in an equally spaced relationship in a circumferential direction of the disks. Therefore, a thrust is trans-mitted uniformly between the disks, so that no load due to a bending moment is generated and the brake pads 5 and 6 are equally pressed against the disk rotor, to thereby obtain a stable braking force. By this arrangement, it is possible to suppress the load due to a bending moment acting on the portions for supporting the central disk 15 and the first and second disks 22 and 23. Therefore, the supporting portions are not required to have high strength, leading to a reduction in size and weight of these portions.

The ball grooves 22 and 23 and the ball grooves 28 and 29 of the first and second ball ramp mechanisms 11 and 12 are arranged on identical circumferential lines on opposite sides of the central disk 15, and the balls 21 between the ball grooves 22 and 23 and the balls 27 between the ball grooves 28 and 29 are always disposed at the same position on opposite sides of a disk portion of the central disk 15 (see FIGS. 9 to 11). Therefore, when the brake pads 5 and 6 are pressed during braking, the load acting on the balls 21 and 27 due to a reaction force can be supported directly by the disk portion of the central disk 15 at portions thereof between the balls 21 and 27. By this arrangement, only compressive force from the balls 21 and 27 is applied to the central disk 15 and no load due to a bending moment is applied to the central disk 15. Therefore, sufficient rigidity of a portion for supporting the central disk can be easily obtained. That is, the supporting portion is not required to have high strength. This leads to a reduction in size and weight of the supporting portion.

Further, the first and second ball ramp mechanisms 11 and 12, which operate to move the brake pads 5 and 6 at opposite sides of the disk rotor 2, are disposed adjacent to the disk rotor 2 and the motor 10 is disposed outside the first and second ball ramp mechanisms 11 and 12. By this arrangement, the distance between the first ball ramp mechanism 11 and the brake pad 5 and the distance between the second ball ramp mechanism 12 and the brake pad 6 can be made sufficiently small. Therefore, it is easy to obtain sufficient rigidity of the claw portion 4 and the cylindrical portion 26a for transmitting a thrust between the ball ramp mechanisms and the brake pads. Therefore, no high strength is required with respect to the claw portion 4 and the cylindrical portion 26a, leading to a reduction in size and weight of these portions.

For removing the braking force, the operation of the motor 10 is reversed so that the central disk 15 is rotated In the counterclockwise direction to its original position. Due to the force of the return spring means, the first disk 20 and the second disk 26 move in a direction for retracting the piston 25 and the claw portion 4. Thus, the brake pads 5 and 6 move away from the disk rotor 2, to thereby remove the braking force. In this instance, the piston 25 and the claw portion 4 move equal distances due to restriction imparted by the first and second ball ramp mechanisms 11 and 12 Therefore, the brake pads 5 and 6 can be moved away from the disk rotor 2 equally, to thereby suppress dragging of the brake pads.

Figure 12A:
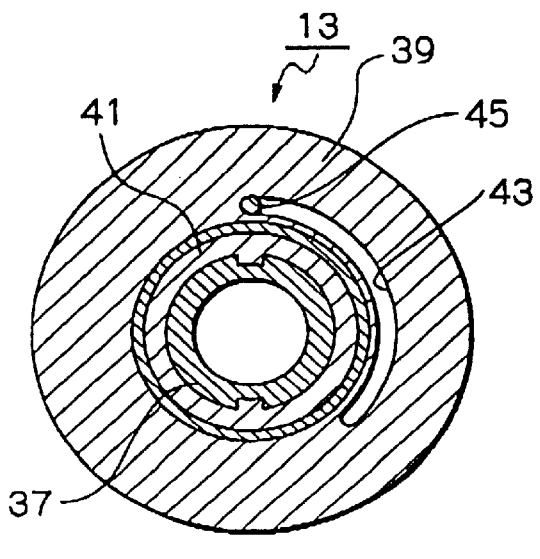
FIGS. 12A to 12D are views explaining an operation of a pad wear compensating mechanism of the disk brake of FIG. 1.
Figure 12B:
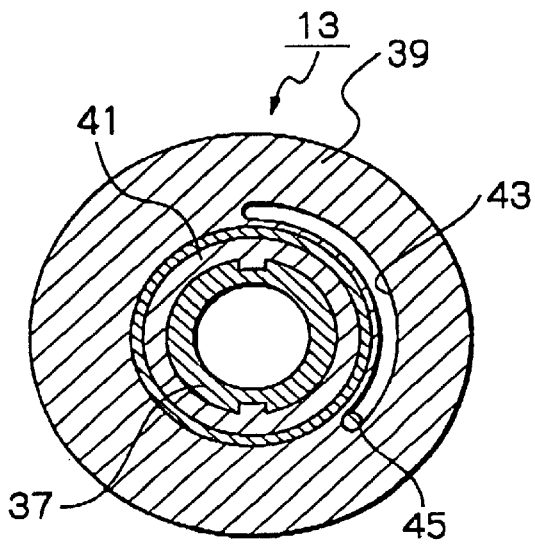
Figure 12C:
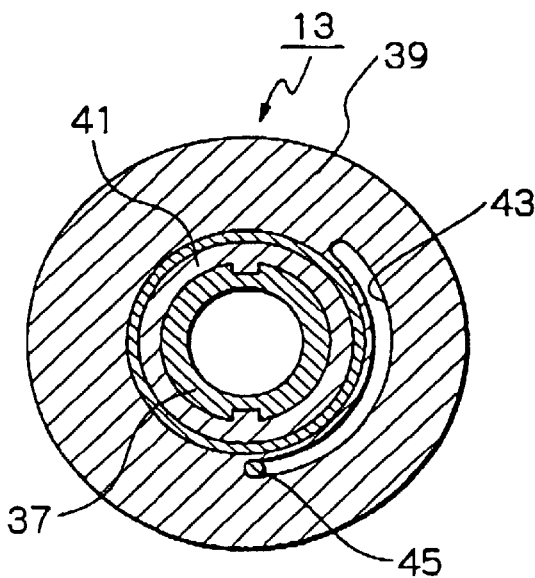
Figure 12D:
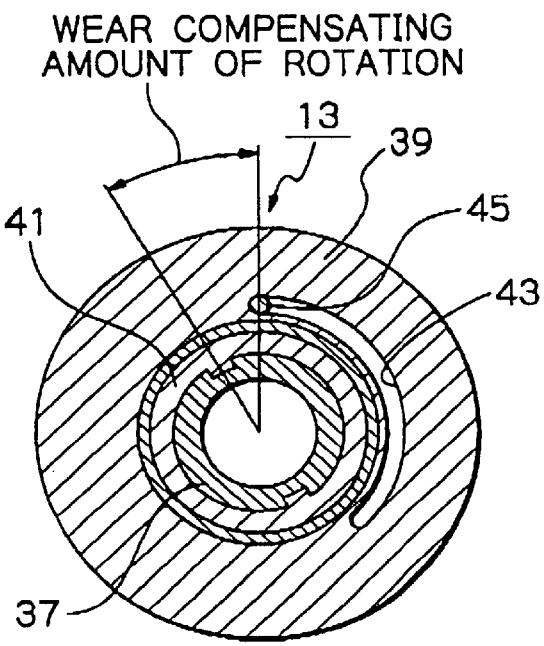
Figure 13:
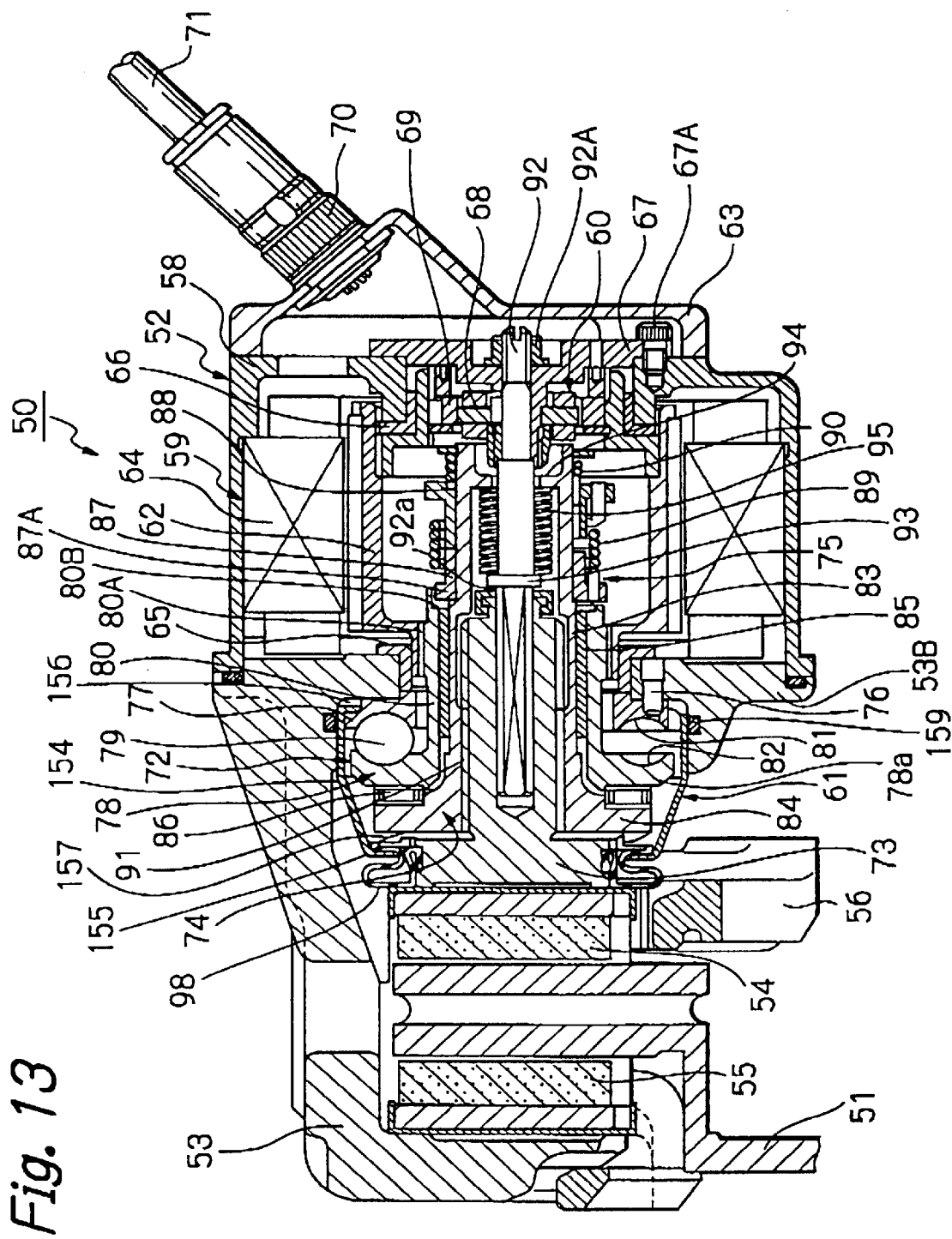
FIG. 13 is a vertical cross-sectional view of a motor-driven disk brake according to a second embodiment of the present invention.
Figure 14:
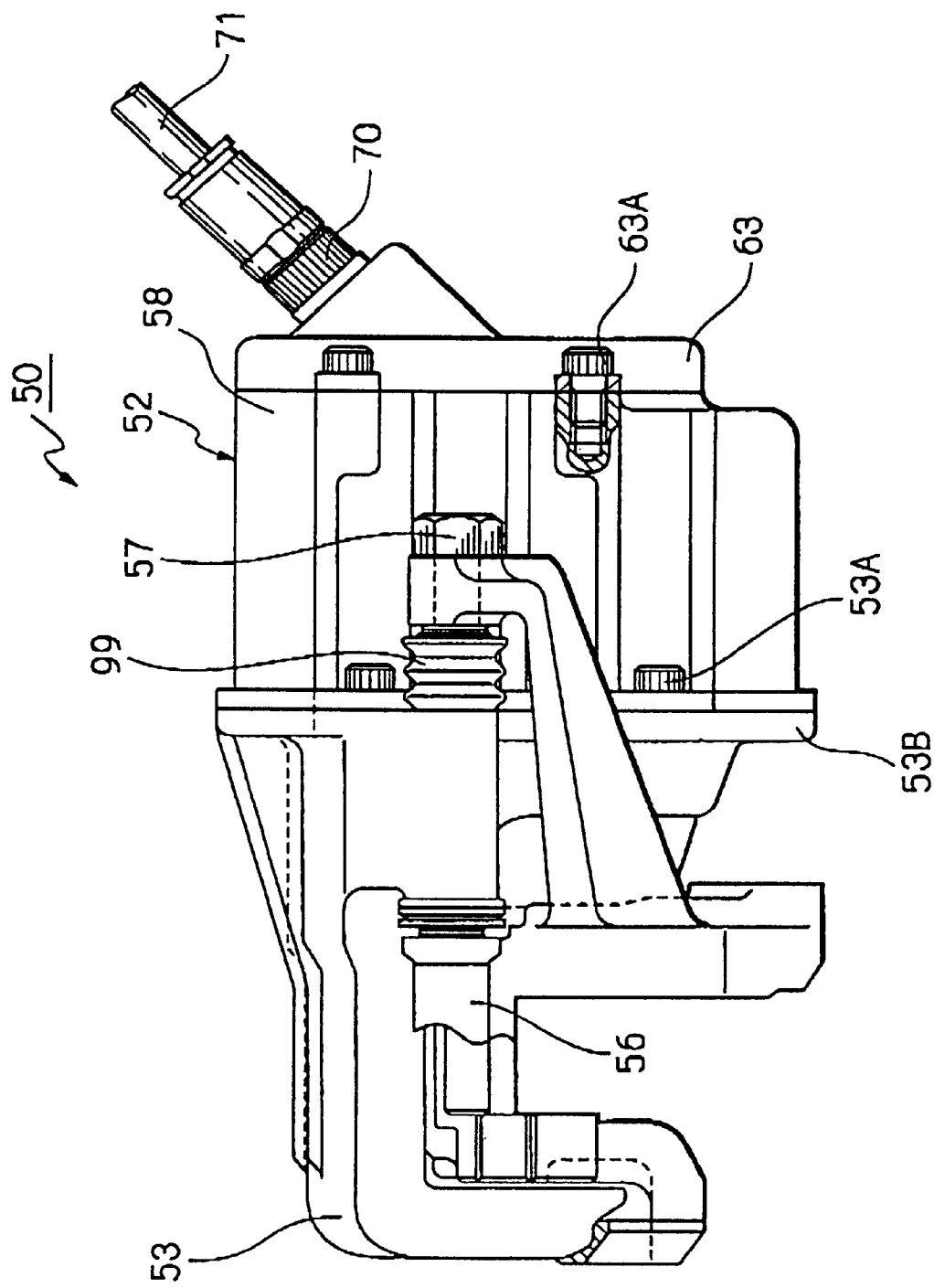
FIG. 14 is a partially cut-away side view of the disk brake of FIG. 13.
Figure 15:
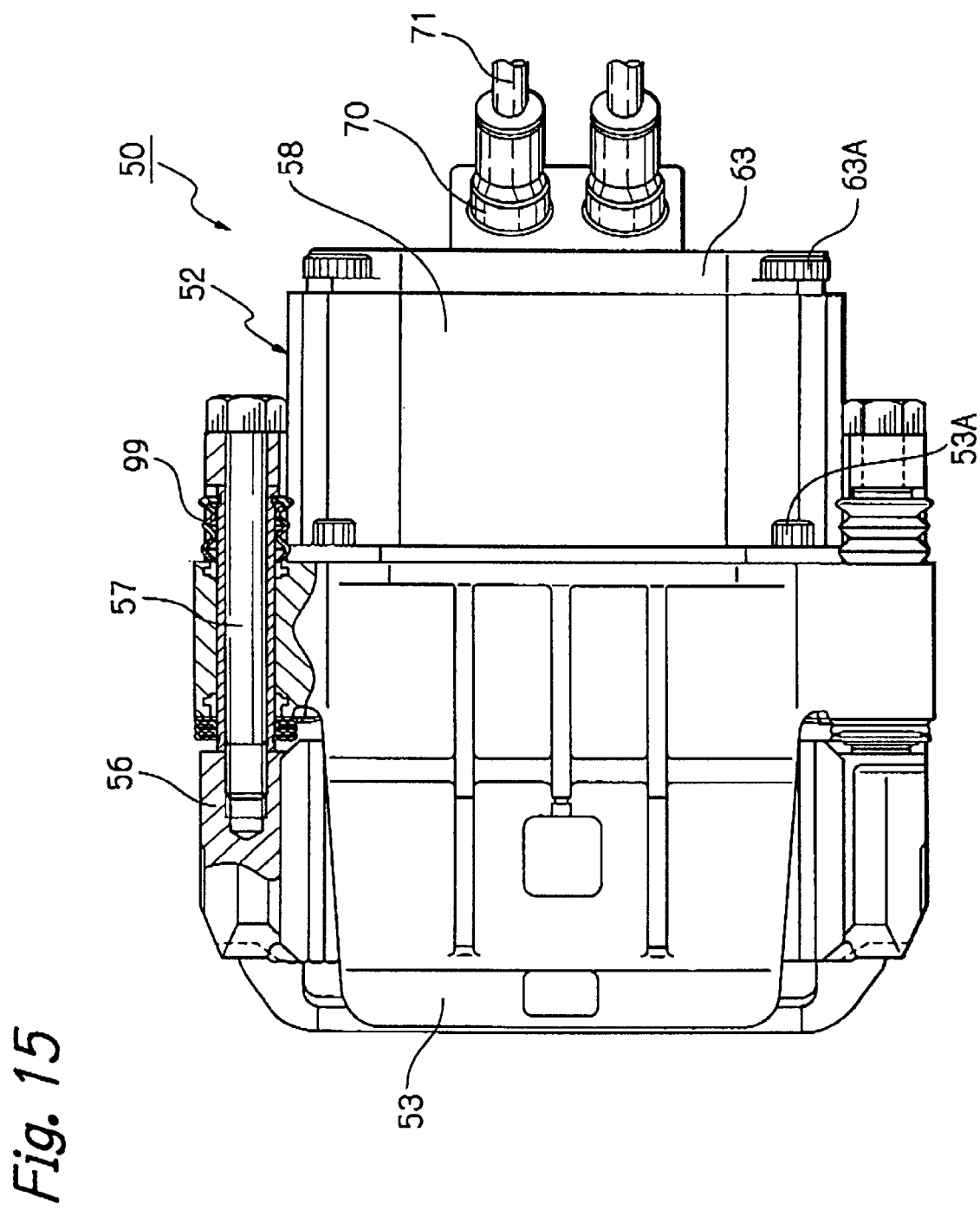
FIG. 15 is a partially cut-away plan view of the disk brake of FIG. 13.
Figure 16:
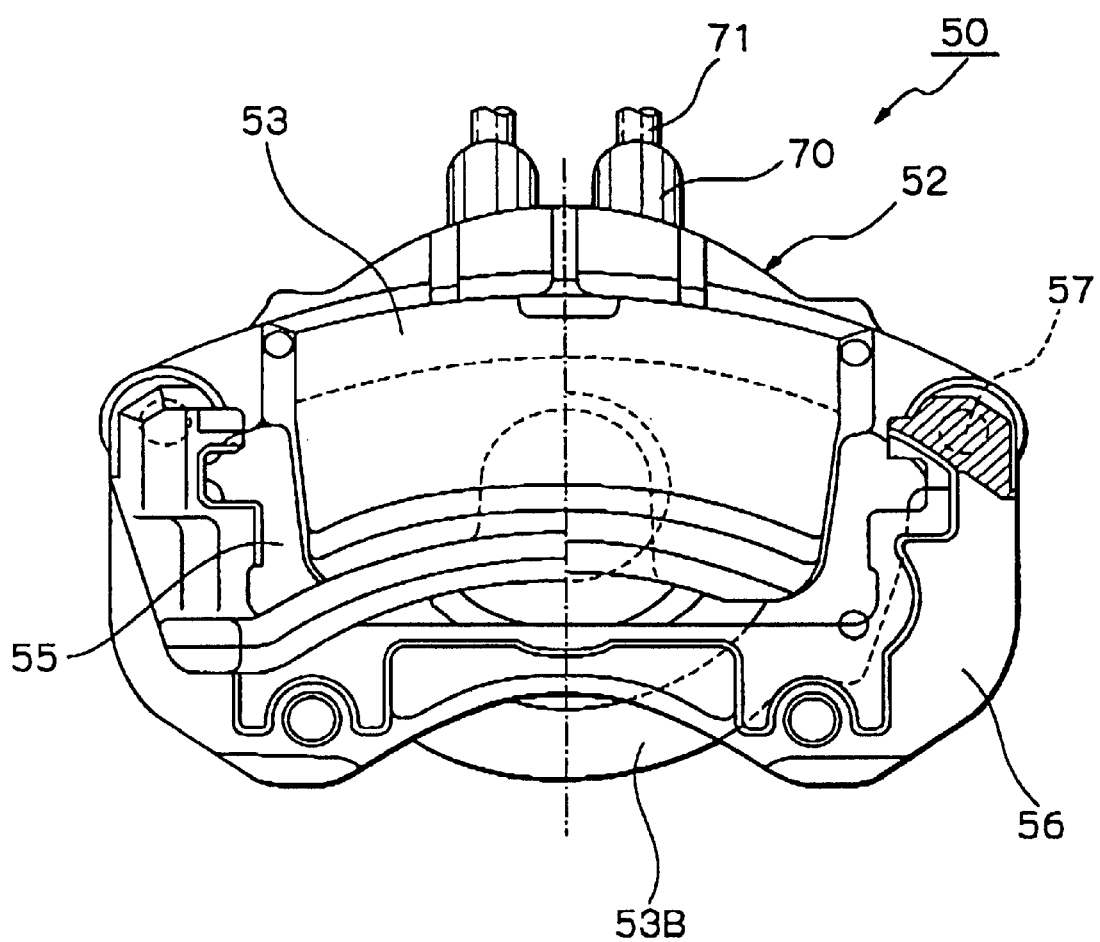
FIG. 16 is a partially cut-away front view of the disk brake of FIG. 13.

Next, referring to FIGS. 12A to 12D, an operation of the pad wear compensating mechanism 13 is explained. When the brake pads 5 and 6 are in an unworn state or after wear compensation has been effected in a manner as mentioned below, the central disk 15 angularly moved or pivots in a predetermined range between its non-braking position (when the brake pads 5 and 6 are located at their positions at the time of starting the operation of the brake) and its braking position (when the brake pads 5 and 6 are pressed against the disk rotor 2). In this case, the engaging pin 45 also moves in a predetermined range between its non-braking position as shown in FIG. 12A and its braking position as shown in FIG. 12B within the engaging groove 43.

When at least one of the brake pads 5 and 6 has been worn, during braking, the displacement of the central disk 15 increases by the amount corresponding to the amount of wear and the engaging pin 45 abuts against the end portion of the engaging groove 43, to thereby rotate the pivotal member 39 in the clockwise direction to a position (C) against the resilient force of the leaf springs 40. In this instance, the one-way clutch 41 allows the pivotal member 39 to rotate relative to the sliding member 37 in the clockwise direction, so that no rotation of the sliding member 37 occurs, that is, no rotation of the piston 25 occurs. Thereafter, when the braking force has been removed and the engaging pin 45 moves toward its non-braking position, the pivotal member 39 is rotated in the counterclockwise direction to its original position, by the resilient force of the leaf springs 40. In this instance, the one-way clutch 41 inhibits relative rotation between the sliding member 37 and the pivotal member 39, so that the sliding member 37, together with the pivotal member 39, rotates in the counterclockwise direction to a position shown in FIG. 12D, to thereby rotate the piston 25 in the counterclockwise direction. Consequently, the adjusting threaded portion 36 moves the piston 25 toward the brake pad 5 by a distance corresponding to the amount of wear of the worn brake pad.

Thus, the piston 25 moves toward the brake pad 5 by a distance corresponding to the amount of wear of the worn brake pad. Therefore, it is possible to compensate for the wear of the worn pad even when the strokes of the first and second ball ramp mechanisms 11 and 12 are small, thus enabling the brake pads to have a long lifetime.

In the above-mentioned embodiment, the three ball grooves are formed in each of the opposed surfaces of the central disk 15 and the first and second disks 20 and 26. However, the number of ball grooves is not limited to that in the above-mentioned embodiment. Four or more ball grooves may be arranged in an equally spaced relationship in a circumferential direction of the disks. A thrust can be uniformly transmitted by means of three or more ball grooves.

In the above-mentioned motor-driven disk brake, the brake pads at opposite sides of the disk rotor are capable of equally pressing and moving away from the disk rotor, according to movement of the piston and the claw portion effected by the first and second ball ramp mechanisms. Therefore, dragging of the brake pads can be prevented Further, a thrust can be uniformly transmitted by means of the balls which are disposed between the ball grooves in the central disk and the first and second disks of the first and second ball ramp mechanisms. Therefore, it is possible to suppress the load due to a bending moment acting on the portions for supporting these disks.

Next, a second embodiment of the present invention is described, with reference to FIGS. 13 to 23.

As shown in FIGS. 13 to 16, in a motor-driven disk brake 50 in the second embodiment, a caliper body 52 is disposed at one side of a disk rotor 51 (generally inwardly relative to a vehicle body) which rotates with a vehicle wheel (not shown). A claw portion 53 having a generally C-shaped cross-section is connected integrally to the caliper body 52 by bolts 53A so as to extend over the disk rotor 51 to a side remote from the caliper body 52. Brake pads 54 and 55 are disposed at opposite sides of the disk rotor 51, that is, between the disk rotor 51 and the caliper body 52 and between the disk rotor 51 and the claw portion 53, respectively. The brake pads 54 and 55 are supported by a carrier 56 fixed to the vehicle body, so as to be movable along the axis of the disk rotor 51, thus enabling the carrier 56 to receive the braking torque. The caliper body 52 is guided by slide pins 57 provided in the carrier 56, so as to be movable along the axis of the disk rotor 51.

An annular flange portion 53B of the claw portion 53 is connected to a generally cylindrical case 58 of the caliper body 52. An electric motor 59 and a rotation detector 60 are provided the case 58. A ball ramp unit 61 is inserted into an opening of the flange portion 53B of the claw portion 53 and provided in a rotor 62 of the motor 59. A cover 63 is attached to a rear end portion of the case 58 by means of bolts 63A.

The motor 59 comprises a stator 64 fixed to an inner circumferential surface of the case 58 and the rotor 62 facing an inner circumferential surface of the stator 64. The rotor 62 is supported in the case 58 by slide bearings 65 and 66 so as to be rotatable and be movable in an axial direction. The rotation detector 60 comprises a resolver stator 68 and a resolver rotor 69. The resolver stator 68 is fixed to a resolver case 67 which is attached to the case 58 by means of a bolt 67A and the resolver rotor 69 is fixed to the rotor 62 so as to face the resolver stator 68. The rotation detector 60 detects the number of times of rotation (rotational speed) of the rotor 62, based on relative rotation between the resolver stator 68 and the resolver rotor 69. A connector 70 and a cable 71 connected to the motor 59 and the rotation detector 60 are attached to the cover 63. The motor 59 rotates the rotor 62 by a desired angle by generating a desired torque in response to a control signal (an electric signal) from a controller (not shown). The connector 70 and the cable 71 are tilted relative to the direction of the axis of the disk rotor 51 and extend radially outward, so as to avoid interference with an arm, a link, a knuckle, a strut, etc. of a suspension apparatus for the vehicle.

The ball ramp unit 61 comprises: a ball ramp mechanism 72 for converting rotation of the rotor 62 of the motor 59 to a linear motion; a piston 73 for pressing the brake pad 54; an adjusting nut 14 provided between the ball ramp mechanism 72 and the piston 73; and a limiter mechanism 75 for transmitting rotation of the ball ramp mechanism 72 to the adjusting nut 74.

The ball ramp mechanism 72 comprises: an annular fixed disk 77 in contact with the flange portion 53B of the claw portion 53 and fixed by pins 76 so as to prevent rotation thereof; a movable disk 78 disposed so as to face the fixed disk 77; and balls 79 (made of steel) provided between the fixed disk 77 and the movable disk 78. The movable disk 78 comprises a flange portion 78a disposed so as to face the fixed disk 77 and a cylindrical portion 80 formed integrally with the flange portion 78a so as to extend through the fixed disk 77 to the inside of the case 58. The cylindrical portion 80 is in splined engagement with an inner circumferential surface of the rotor 62 at a spline connecting portion 80A. The spline connecting portion 80A is formed with predetermined tolerances in a direction of rotation and a radial direction, in consideration of axial slidability, dimensional tolerances and ease in assembling.

As in the case of the second ball ramp mechanism in the first embodiment, each of the opposed surfaces of the disks include ball grooves, each extending in an arc form in a circumferential direction of the disks. The surface of the fixed disk 77 facing the movable disk 78 includes three ball grooves 81 and the surface of the movable disk 78 facing the fixed disk 77 includes three ball grooves 82. The balls 79 are provided between the ball grooves 81 and 82. Due to rotation of the movable disk 78 relative to the fixed disk 77, the three balls 79 roll within the ball grooves 81 and 82, to thereby move the fixed disk 77 and the movable disk 78 relative to each other in an axial direction thereof according to an angle of rotation of the movable disk 78.

The adjusting nut 74 comprises a cylindrical portion 83 and a flange portion 84 formed integrally with each other. The flange portion 84 is formed so as to extend radially outward from an end portion of the cylindrical portion 83. The cylindrical portion 83 extends through the cylindrical portion 80 of the movable disk 78 and is rotatably supported by a slide bearing 85. The flange portion 84 is rotatably supported by a thrust bearing 86 which abuts against an end portion of the movable disk 78. The cylindrical portion 83 of the adjusting nut 74 extends to the inside of the rotor 62 in the case 58. The limiter mechanism 75 is attached to an outer circumferential surface of a distal end portion of the cylindrical portion 83.

The limiter mechanism 75 comprises a limiter 87, a spring holder 88 and a coil spring 89. The limiter 87 and the spring holder 88 are rotatably fitted on the outer circumferential surface of the distal end portion of the cylindrical portion 83 of the adjusting nut 74. The limiter 87 and the spring holder 88 are connected by means of the coil spring 89. The limiter 87 and the spring holder 88 are engaged with each other so as to permit relative rotation therebetween in a predetermined range. A predetermined set load is applied in a direction of rotation by the coil spring 89. The limiter 87 is capable of rotating relative to the spring holder 88 in a clockwise direction (in this embodiment, "clockwise direction" means the clockwise direction as viewed from the left side of FIG. 13) against the set load of the coil spring 89. An engaging recess 87A formed in the limiter 87 is engaged with an engaging protrusion 80B formed at an end portion of the cylindrical portion 80 of the movable disk 78 (see FIGS. 13, 17 and 18). The limiter 87 is capable of rotating relative to the cylindrical portion 80 in a predetermined range. Further, a clutch spring (coil spring) 90 is wound around the outer circumferential surface of the distal end portion of the cylindrical portion 83 of the adjusting nut 74. An end portion of the clutch spring 90 is connected to the spring holder 88. The clutch spring 90 serves as a one-way clutch due to radial expansion and contraction thereof caused by twisting, and only the rotation of the spring holder 88 In the clockwise direction is transmitted to the cylindrical portion 83 of the adjusting nut 74.

The piston 73 is thread ably engaged with a threaded portion. (pad wear compensating mechanism) 91 formed on an inner circumferential surface of the adjusting nut 74. When the adjusting nut 74 rotates in the clockwise direction relative to the piston 73, the piston 73 advances toward the brake pad 54. A rod 92 for restricting rotation of the piston 73 is provided in the cylindrical portion 83 of the adjusting nut 74. One end portion of the rod 92 is fixed to the resolver case 67 by means of a nut 92A The other end portion of the rod 92 is provided within the piston 73 so as to permit axial sliding movement thereof and is engaged with the piston 73 so as to restrict rotation of the piston 73. A small-diameter portion 73C including grooves 73B forming two cut portions 73A is formed at a rear end portion of the piston 73 (see FIGS. 20 and 21). A cap 73*b* (see FIGS. 22 and 23) for restricting relative rotation between the rod 92 and the piston 73 is attached to the small-diameter portion 73C. The cap 73*b* includes claw portions 73*a* engageable with the grooves 73B. The cap 73*b* is attached to the small-diameter portion 73C by fitting the claw portions 73*a* into the grooves 73B from opposite sides of the small-diameter portion 73C. The cap 73*b* includes a two-sided opening 73*c* having a diameter which is the same as an inner diameter of the piston 73. A two-sided portion 92*a* formed at the other end portion of the rod 92 is inserted into and fitted in the two-sided opening 73*c*. Thus, relative rotation between the rod 92 and the piston 73 is restricted, while relative axial movement between the rod 92 and the piston 73 is restricted. A plurality of Belleville springs 95 are provided between a flange portion 93 formed at an intermediate portion of the rod 92 (a proximal end portion of the two-sided portion 92*a*) and a flange portion 94 formed within the cylindrical portion 83 of the adjusting nut 74. The adjusting nut 74 is biased in a rightward direction in FIG. 13 under force of the Belleville springs 95. By shifting an axial position of the rod 92 by using the nut 92A, the biasing force applied to the adjusting nut 74 (a set load of the Belleville springs 95) can be adjusted.

The ball ramp mechanism 72, the adjusting nut 74 and the piston 73 are covered with a case 154 for assembling the ball ramp unit 61 as a subunit. A wave washer 157 for imparting appropriate resistance to rotation of the adjusting nut 74 is provided between a front end flange portion of the case 154 and the flange portion 84 of the adjusting nut 74.

Illustrative description is made below on the case 154 and the wave washer 157. The case 154 is in a generally cylindrical form and is attached so as to cover the fixed disk 77 and the movable disk 78 of the ball ramp mechanism 72 and the adjusting nut 74 in a circumferential direction. A flange portion 155 is formed so as to extend radially inward from a tapered distal end portion of the case 154. An engaging claw 156 including a cut portion extends radially inward from a cylindrical rear end portion of the case 154. The fixed disk 77, the movable disk 78 and the balls 79 are held as a unit by engaging the fixed disk 77 with the engaging claw 156 and providing the wave washer 157 between the flange portion 155 and the flange portion 84 of the adjusting nut 74. In this state, due to resilience of the wave washer 157, axial movement of the movable disk 78 and the adjusting nut 74 is permitted, while imparting appropriate resistance to rotation of the adjusting nut 74. A piston boot 98 is attached to the flange portion 155 A distal end portion of the piston boot 98 is connected to an outer circumferential surface of a distal end portion of the piston 73 attached to the adjusting nut 74. A cylindrical portion of the case 154 is fitted into the claw portion 53 with a space therebetween being sealed with an O-ring 159. In the drawings, reference numeral 99 denotes a pin boot.

Next, explanation is made below on an operation of the motor-driven disk brake in the second embodiment.

For generating a braking force, the rotor 62 of the motor 59 rotates in the clockwise direction by generating a predetermined torque, in response to a control signal from the controller (not shown). The movable disk 78 of the ball ramp mechanism 72 rotates through the spline connecting portion 80A, so that the balls 79 roll along the ball grooves 81 and 82. Consequently, the movable disk 78 axially moves, while rotating, toward the brake pad 54. An axial thrust of the movable disk 78 is transmitted through the thrust bearing 86 to the adjusting nut 74. The adjusting nut 74, together with the movable disk 78, advances toward the brake pad 54 against the force of the Belleville springs 95 and the wave washer 157. In this instance, the axial thrust is further transmitted from the adjusting nut 74 through the threaded portion 91 to the piston 73, and the piston 73 advances toward the brake pad 54, together with the adjusting nut 74 and the movable disk 78. Consequently, the brake pad 54 is pressed against the disk rotor 51, and the caliper body 52 moves by the slide pins 57 of the carrier 56 due to a reaction force. Consequently, the claw portion 53 presses the brake pad 55 against the disk rotor 51, thus generating a braking force according to the torque of the motor 59.

As in the case of the first embodiment, by reducing the inclination of the bottom surfaces of the ball grooves 81 and 82 of the ball ramp mechanism 72, a sufficiently small lead relative to rotational displacement can be obtained. Therefore, a high transmission ratio can be obtained and a large output of the motor 59 becomes unnecessary. This leads to a reduction in power consumption and a reduction in size of the motor. Further, each of the opposed surfaces of the fixed disk 77 and the movable disk 78 includes three ball grooves which are arranged in an equally spaced relationship in a circumferential direction of the disks. Therefore, a thrust is transmitted uniformly between the disks, so that no load due to a bending moment is generated and the brake pads 54 and 55 are equally pressed, to thereby obtain a stable braking force. By this arrangement, it is possible to suppress the load due to a bending moment acting on the portions for supporting the fixed disk 77 and the movable disk 78. Therefore, the supporting portions are not required to have high strength, leading to a reduction in size and weight of these portions.

Further, the ball ramp mechanism 72, which operates to move the brake pads 54 and 55 at opposite sides of the disk rotor 51, is disposed adjacent to the disk rotor 51 and fixed to the inside of the generally C-shaped claw portion 53 and the motor 59 Is disposed outside the claw portion 53. By this arrangement, the distance between the ball ramp mechanism 72 and each of the brake pads 54 and 55 can be made sufficiently small. Therefore, the thrust can be transmitted directly by the claw portion 53. By this arrangement, the case 58 for the motor 59 does not directly receive the load during braking. Therefore, a thin-walled material or a lightweight material can be used as the case 58, thereby enabling a reduction in weight of the case 58 and high heat radiation from the motor 59. Further, the reaction force during braking is not directly applied to the bearing portion for the rotor 62, so that the structure of the bearing portion of the motor 59 can be simplified.

For removing the braking force, the operation of the motor 59 is reversed so that the movable disk 78 is rotated in the counterclockwise direction to its original position. The movable disk 78, the adjusting nut 74 and the piston 73 retract due to the force of the Belleville springs 95, to thereby move the brake pads 54 and 55 away from the disk rotor 51, thus removing the braking force.

Figure 17:
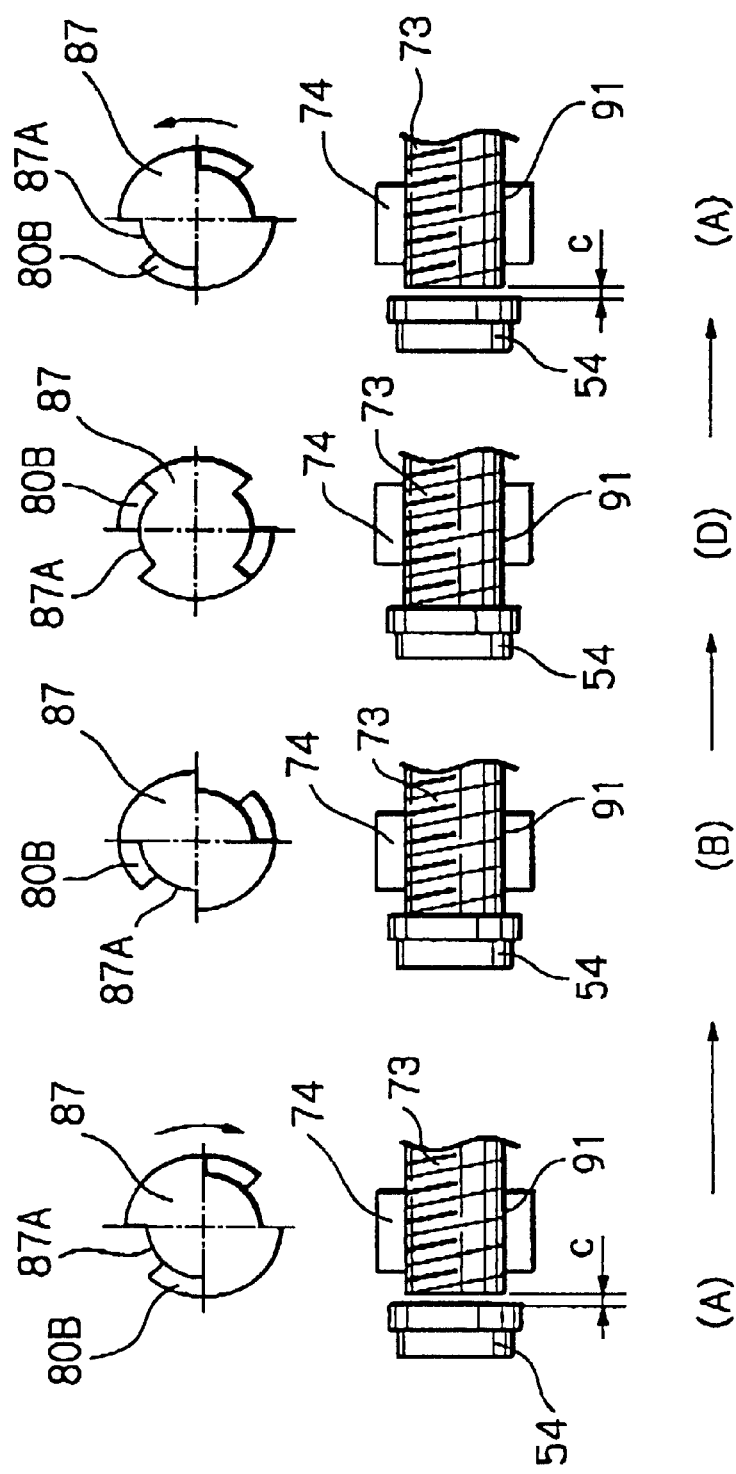
FIG. 17 is a view explaining an operation of a pad wear compensating mechanism of the disk brake of FIG. 13 when the pad is in an unworn state.
Figure 18:
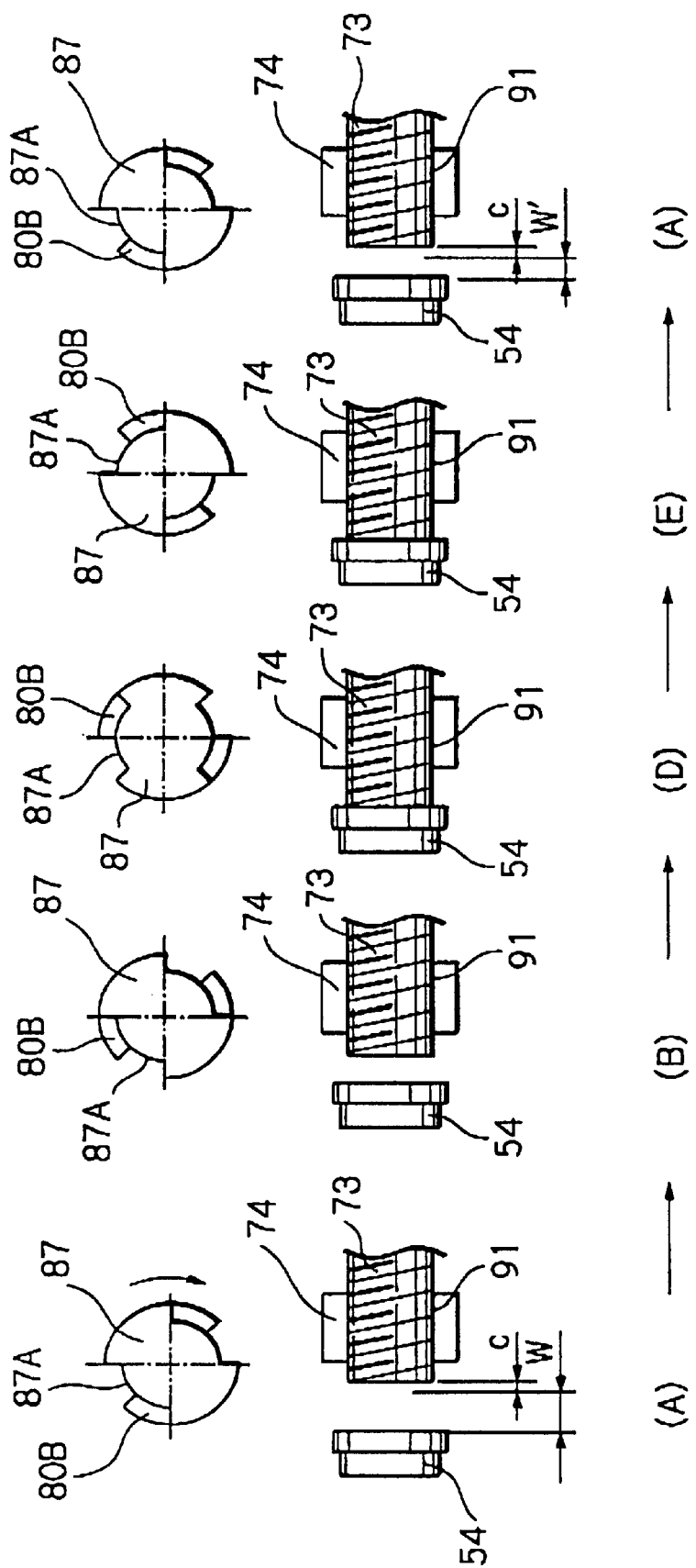
FIG. 18 is a view explaining an operation of the pad wear compensating mechanism of the disk brake of FIG. 13 when the pad has been worn.

Next, referring to FIGS. 17 and 18, explanation is made on wear compensation for the brake pads 54 and 55. The positional relationship between the piston 73 and the brake pad 54 is the same as that between the claw portion 53 and the brake pad 55. Therefore, in FIGS. 17 and 18, only the relationship between the piston 73 and the brake pad 54 is shown.

When the brake pad 54 is in an unworn state or after wear compensation has been effected in a manner as mentioned below, as shown in FIG. 17, according to rotation of the rotor 62 during braking, the piston 73 advances by a distance equal to a pad clearance C from a non-braking position (A) and reaches a brake starting position (B), where the brake pad 54 abuts against the disk rotor 51. During movement of the piston 73 from the position (A) to the position (B), the engaging protrusion 80B of the cylindrical portion 80 of the movable disk 78 rotates along the engaging recess 87A of the limiter 87, so as to move from one end portion to the other end portion of the engaging recess 87A. When the piston 73 presses the brake pad 54 against the disk rotor 51 and moves to a braking position (D), the engaging protrusion 80B rotates the limiter 87 in the clockwise direction and the torque from the limiter 87 is transmitted through the coil spring 89 and the clutch spring 90 to the adjusting nut 74. In this instance, the piston 73 presses the brake pad 54 against the disk rotor 51, so that a large friction force is generated in the threaded portion 90 between the piston 73 and the adjusting nut 74. Therefore, the coil spring 89 deflects and no rotation of the adjusting nut 74 occurs. When the piston 73 retracts to the non-braking position (A) according to rotation of the movable disk 78 in the opposite direction for removing the braking force, the engaging protrusion 80B abuts against the one end portion of the engaging recess 87A, to thereby rotate the limiter 87 and the spring holder 88 in the counterclockwise direction. In this instance, the clutch spring 90 radially expands, so that no rotation of the piston 73 occurs. Thus, no pad wear compensation is effected and a predetermined pad clearance is maintained.

When the brake pad 54 has been worn, pad wear compensation is effected as follows. As shown in FIG. 18, during braking, the piston 73 moves by the distance equal to the pad clearance C from the non-braking position (A) and reaches the position (B) according to rotation of the rotor 62 in the clockwise direction. During the above movement of the piston 73, the engaging protrusion 80B moves from one end portion to the other end portion of the engaging recess 87A. However, due to a clearance W formed between the piston 73 and the brake pad 54 due to wear, the piston 73 does not press the brake pad 54. According to further rotation of the rotor 62, the movable disk 78 and the adjusting nut 74 advance toward the disk rotor 51 and reach a position (D), where the piston 73 enables the brake pad 54 to abut against the disk rotor 51. During the movement of the piston 73 from the position (B) to the position (D), the engaging protrusion 80B rotates the limiter 87 in the clockwise direction and the torque from the limiter 87 is transmitted to the adjusting nut 74 through the coil spring 89 and the clutch spring 90. Meanwhile, the piston 73 does not press the brake pad 54 against the disk rotor 51, so that no large friction force is generated in the threaded portion 91 between the piston. 73 and the adjusting nut 74. Therefore, the adjusting nut 74 rotates in the clockwise direction so as to move the piston 73 toward the brake pad 54, thereby compensating for the wear of the pad. When the piston 73 presses the brake pad 54 against the disk rotor 51 and moves to a position (E), a large friction force is generated in the threaded portion 91 between the piston 73 and the adjusting nut 74, so that the coil spring 89 deflects and the rotation of the adjusting nut 74 is stopped. when the piston 73 retracts to the non-braking position (A) according to rotation of the rotor 62 in the counterclockwise direction for removing the braking force, the engaging protrusion 80B abuts against the one end portion of the engaging recess 87A, to thereby rotate the limiter 87 in the counterclockwise direction. In this instance, the clutch spring 90 radially expands, so that no rotation of the adjusting nut 74 occurs. Consequently, the clearance W due to wear between the brake pad 54 and the piston 73 at the non-braking position decreases to a clearance W'. Thus, by a single operation of the brake, the non-braking position of the piston 73 can be shifted away from the adjusting nut 74 toward the brake pad 54, by a distance in a predetermined ratio relative to the clearance due to wear. By repeating the operation of the brake, pad wear compensation can be effected so as to achieve the same effect as that of the first embodiment.

Figure 19A:
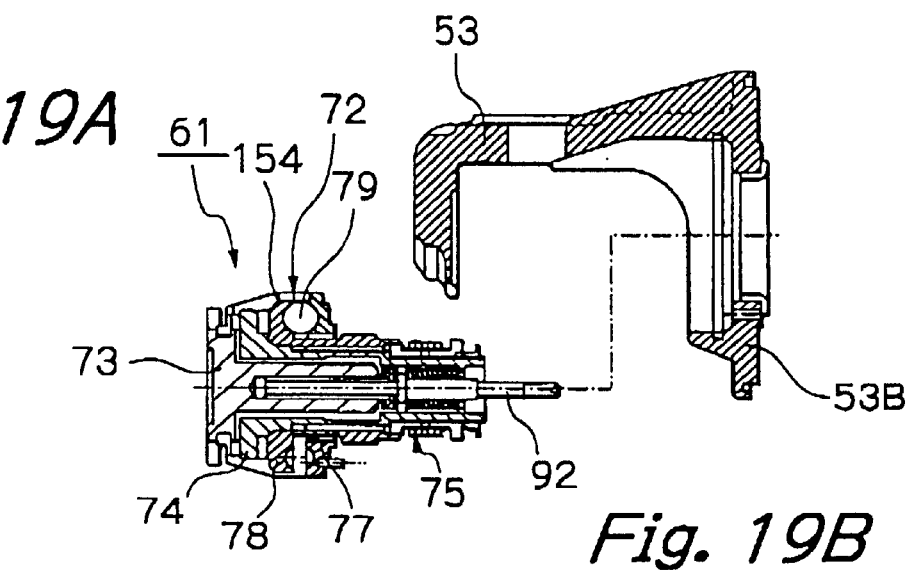
FIGS. 19A to 19C are views explaining a process of assembling the disk brake of FIG. 13.
Figure 19B:
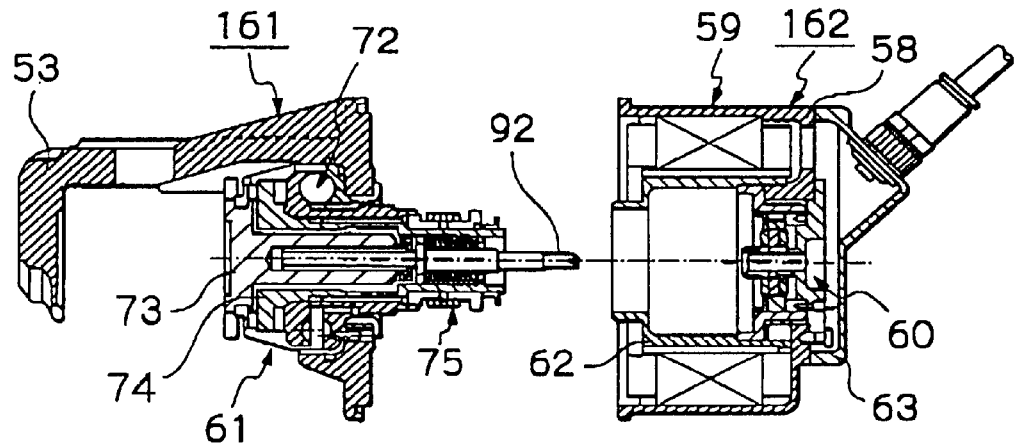
Figure 19C:
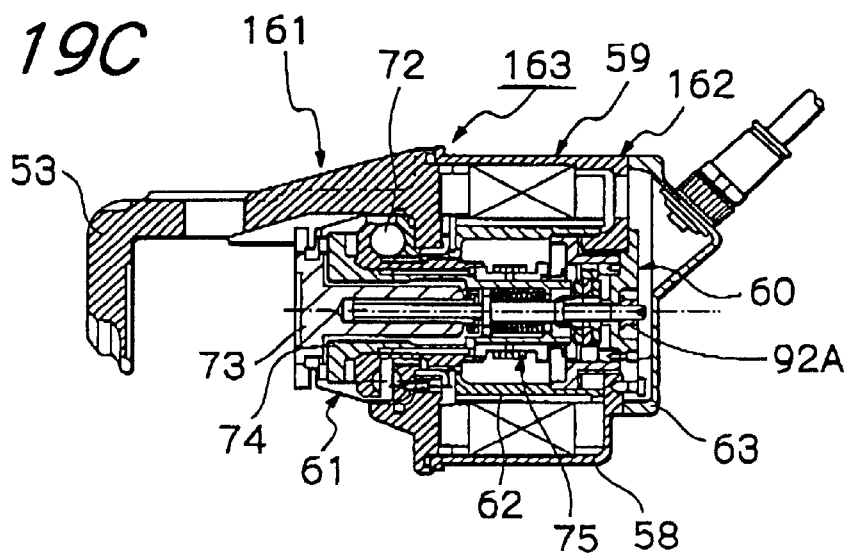
Figure 20:
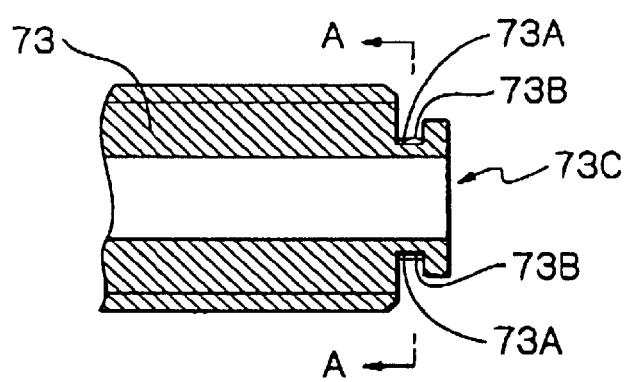
FIG. 20 is a vertical cross-sectional view of a rear end portion of a piston of the disk brake of FIG. 13.
Figure 21:
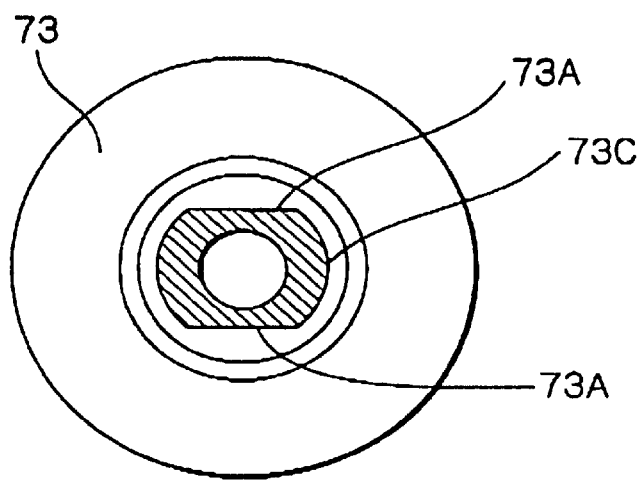
FIG. 21 is a vertical cross-sectional view, taken along the line A—A in FIG. 20.
Figure 22:
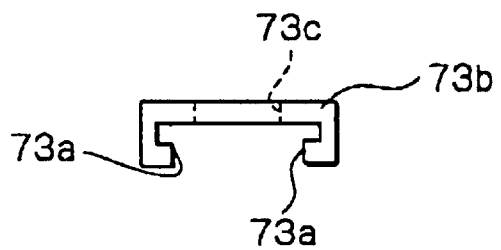
FIG. 22 is a side view of a cap connected to the piston of the disk brake of FIG. 13.
Figure 23:
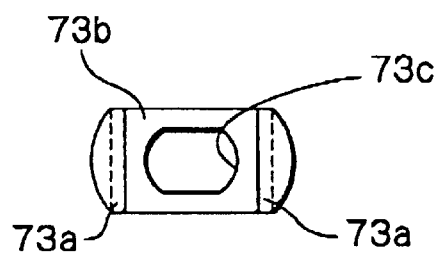
FIG. 23 is a front view of the cap connected to the piston of the disk brake of FIG. 13.

Next, referring to FIGS. 19A, 19B and 19C, explanation is made on assembling the motor-driven disk brake 50.

As shown In FIG. 19A, the ball ramp mechanism 72, the adjusting nut 74, the piston 73, the rod 92, the Belleville springs 95, the wave washer 157 and the piston boot 98 are assembled as a unit by means of the case 154. The limiter mechanism 75 is then connected to the cylindrical portion 80 of the adjusting nut 74, thereby assembling the ball ramp unit 61 as a subunit. The ball ramp unit 61 is inserted into the flange portion 53B of the claw portion 53, to thereby provide a power transmission mechanism portion 161 (see FIG. 19B). As shown in FIG. 19B, the electric motor 59 and the rotation detector 60 are connected to the case 58 and the cover 63, to thereby provide a motor mechanism portion 162 The power transmission mechanism portion 161 and the motor mechanism portion 162 are connected by connecting the cylindrical portion 80 of the movable disk 78 to the spline connecting portion 80A of the rotor 62 of the motor 59 and thread ably engaging the nut 92A with the rod 92, to thereby provide a motor-driven caliper 163 (FIG. 19C). The motor-driven caliper 163 is mounted on the carrier 56 which supports the brake pads 54 and 55, to thereby assemble the motor-driven disk brake 50.

Thus, the motor-driven disk brake 50 can be easily assembled by connecting the power transmission mechanism portion 161 (the ball ramp unit 61 and the claw portion 53) and the motor mechanism portion 162, each being assembled as a subunit The spline connecting portion 80A between the movable disk 78 and the rotor 62 of the motor 59 is formed with appropriate tolerances so as to absorb dimensional tolerances, leading to easy assembling and disassembling of the power transmission mechanism portion 161 and the motor mechanism portion 162. Further, due to the tolerances in the spline connecting portion 80A, deflection of the movable disk 78 can be absorbed and the load applied to the slide bearings 65 and 66 for the rotor 62 can be reduced Further, by supporting the case 154 resiliently through the O-ring 159, an impact from the brake pads 54 and 55 can be absorbed by the O-ring 159.

In the above-mentioned motor-driven disk brake, the ball ramp mechanism is disposed in the vicinity of the disk rotor and the thrust from the ball ramp mechanism can be transmitted directly to the claw portion. Therefore, the case for the motor does not directly receive the load during braking, and a thin-walled material or a light weight material can be used as the case, thus enabling a reduction in weight of the case and high heat radiation from the motor. Further, the reaction force during braking is not directly applied to the bearing portion for the rotor, so that the structure of the bearing portion of the motor can be simplified.

Further, in the above-mentioned disk brake, the fixed disk, the movable disk and the balls of the ball ramp mechanism can be accommodated in the case as a unit so as to provide the ball ramp unit. Therefore, the ball ramp mechanism can be easily connected to the caliper body, to thereby facilitate easy assembling of the disk brake.

Further, in the above-mentioned motor-driven disk brake, the pad wear compensating mechanism can be connected to the caliper body, together with the ball ramp mechanism.

Further, in the above-mentioned motor-driven disk brake, the transmission mechanism is assembled as a subunit. Therefore, the transmission mechanism can be easily connected to the caliper body, to thereby facilitate easy assembling of the disk brake. In addition, by connecting the transmission mechanism to the inside of the claw portion, the thrust from the transmission mechanism can be directly transmitted through the claw portion to the brake pads. Therefore, high rigidity of a portion providing a thrust transmission path can be obtained and a thin-walled material or a light weight material can be used as the case, thereby enabling a reduction in weight of the case and high heat radiation from the motor.

The entire disclosure of Japanese Patent Application Nos. 11-93790, 11-114232 and 11-114247 filed on Mar., 31, 1999, Apr. 21, 1999 and Apr. 21, 1999, respectively, each including a specification, claims, drawings and summary are incorporated herein by reference in entireties thereof.

What is claimed is:

1. A motor-driven disk brake comprising:
    a first brake pad and a second brake pad disposed at opposite sides of a disk rotor;
    a piston disposed so as to face said first brake pad;
    a claw portion extending over the disk rotor and facing said second brake pad;
    an electric motor disposed in the vicinity of said piston;
    a ball ramp mechanism operable to convert rotation of said electric motor to a linear motion so as to reciprocally move said piston, to thereby enable application and removal of a braking force relative to the disk rotor by said first and second brake pads, said ball ramp mechanism being disposed between said first brake pad and said electric motor, wherein said electric motor is coaxial with said ball ramp mechanism.

2. The motor-driven disk brake according to claim 1, wherein said electric motor includes a rotor and said ball ramp mechanism converts rotation of said rotor to a linear motion.

3. The motor-driven disk brake according to claim 2, wherein said ball ramp mechanism includes:
    a first ball ramp mechanism operable to convert rotation of said rotor to a linear motion so as to reciprocally move said piston; and
    a second ball ramp mechanism operable to convert rotation of said rotor to a linear motion so as to reciprocally move said claw portion.

4. The motor-driven disk brake according to claim 3, wherein said first and second ball ramp mechanisms include:
    a central disk which rotates with said rotor, said central disk having two end surfaces;
    a first disk connected to said piston, said first disk being disposed so as to have a surface thereof facing one of said two end surfaces of said central disk;
    a second disk connected to said claw portion, said second disk being disposed so as to have a surface thereof facing the other of said two end surfaces of said central disk, said two end surfaces of said central disk and said surface of each of said first and second disks facing each other including ball grooves; and
    balls provided between the ball grooves.

5. The motor-driven disk brake according to claim 2, further comprising a caliper body, wherein said piston is provided in said caliper body, said claw portion is fixed to said caliper body and said electric motor is provided in said caliper body.

6. A motor-driven disk brake comprising:
    a first brake pad and a second brake pad disposed at opposite sides of a disk rotor;
    a piston disposed so as to face said first brake pad;
    a claw portion extending over the disk rotor and facing said second brake pad;
    an electric motor having a rotor, said electric motor disposed in the vicinity of said piston;
    a ball ramp mechanism operable to convert rotation of said rotor of said electric motor to a linear motion so as to reciprocally move said piston, to thereby enable application and removal of a braking force relative to the disk rotor by said first and second brake pads, said ball ramp mechanism being disposed between said first brake pad and said electric motor; and
    a caliper body, said piston being provided in said caliper body, said claw portion being fixed to said caliper body, and said electric motor being provided in said caliper body, and
    wherein said ball ramp mechanism comprises:
        a fixed disk disposed between the disk rotor and said electric motor and fixed to said caliper body;
        a movable disk disposed between the disk rotor and said fixed disk and connected to said piston, said movable disk having a surface thereof facing a surface of said fixed disk; and
        balls provided between ball grooves formed in the surfaces of the movable disk and fixed disk facing each other, the movable disk extending through said fixed disk and being connected to said rotor of said electric motor.

7. The motor-driven disk brake according to claim 1, further comprising a pad wear compensating device operable to effect wear compensation when at least one of said first and second brake pads has been worn, by shifting an original position of said piston during non-braking toward said first and second brake pads.

8. The motor-driven disk brake according to claim 6, further comprising a pad wear compensating device operable to effect wear compensation when at least one of said first and second brake pads has been worn, by shifting an original position of said piston during non-braking toward said first and second brake pads.

9. The motor-driven disk brake according to claim 8, wherein said pad wear compensating device includes:
   a detecting device operable to detect an amount of wear of said at least one of said first and second brake pads; and
   a device operable to shift the original position of said piston toward said first and second brake pads according to the amount of wear of said at least one of said first and second brake pads detected by said detecting device.

10. The motor-driven disk brake according to claim 4, further comprising a case for covering said electric motor, wherein said second disk is formed separately from said case for said electric motor and said second disk is disposed so as to be movable relative to said case, said second disk being formed integrally with said claw portion so as to extend over the disk rotor between a position adjacent to said case and said claw portion, wherein said first and second ball ramp mechanisms are disposed adjacent to the disk rotor inside said second disk and wherein said electric motor is disposed within said case outside of said second disk.

11. The motor-driven disk brake according to claim 5, wherein said caliper body includes a case for covering said electric motor and includes said claw portion, said claw portion having a generally C-shaped cross-section and extending from said case over the disk rotor, wherein said ball ramp mechanism is disposed adjacent to the disk rotor inside said claw portion and wherein said electric motor is disposed within said case outside said claw portion.

12. A motor-driven disk brake comprising:
   a first brake pad and a second brake pad disposed at opposite sides of a disk rotor;
   a piston provided in a caliper body so as to face said first brake pad;
   a claw portion fixed to said caliper body and extending over the disk rotor so as to face said second brake pad;
   an electric motor provided in said caliper body; and
   a ball ramp mechanism operable to convert rotation of a rotor of said electric motor to a linear motion so as to reciprocally move said piston,
   said ball ramp mechanism comprising:
      a fixed disk disposed between the disk rotor and said electric motor and fixed to said caliper body;
      a movable disk disposed between the disk rotor and said fixed disk and connected to said piston, said movable disk having a surface thereof facing a surface of said fixed disk; and
      balls provided between ball grooves formed in said surfaces of said movable disk and said fixed disk facing each other, said movable disk extending through said fixed disk and being connected to said rotor of said electric motor.

13. A motor-driven disk brake for applying and removing a braking force relative to a disk rotor by moving a pair of brake pads disposed at opposite sides of the disk rotor, said motor-driven disk brake comprising:
   a caliper body;
   an electric motor provided in said caliper body; and
   a ball ramp unit connected to said caliper body, said ball ramp unit being adapted to move the pair of brake pads by receiving power of said electric motor,
   said caliper body including:
      a case for covering said electric motor; and
      a claw portion extending from said case over the disk rotor so as to face one of the pair of brake pads,
   said ball ramp unit including:
      a piston facing the other of said pair of brake pads;
      a ball ramp mechanism operable to convert rotation of a rotor of said electric motor to a linear motion so as to reciprocally move said piston, said ball ramp mechanism including a fixed disk which is fixed to said caliper body by connecting said ball ramp unit to said caliper body, a movable disk connected to said piston and balls provided between said fixed disk and said movable disk; and
      a case for covering said fixed disk and said movable disk in a circumferential direction thereof so as to accommodate said piston and said ball ramp mechanism as a unit.

14. The motor-driven disk brake according to claim 13, further comprising a pad wear compensating mechanism connected integrally to said ball ramp unit.

15. A motor-driven disk brake comprising:
   a first brake pad and a second brake pad disposed at opposite sides of a disk rotor;
   a piston provided in a caliper body so as to face said first brake pad;
   a claw portion fixed to said caliper body and extending over the disk rotor so as to face said second brake pad;
   an electric motor provided in said caliper body; and
   a transmission mechanism operable to convert rotation of a rotor of said electric motor to a linear motion so as to reciprocally move said piston,
   wherein said rotor of said electric motor and said transmission mechanism are connected through said claw portion by assembling said transmission mechanism as a subunit, connecting said transmission mechanism to the inside of said claw portion and connecting said electric motor to the outside of said claw portion, wherein
   said electric motor is coaxial with said transmission mechanism.

16. A motor-driven disk brake for applying and removing a braking force relative to a disk rotor by moving a pair of brake pads disposed at opposite sides of the disk rotor, said motor-driven disk brake comprising:
   a piston facing one of the pair of brake pads;
   a claw portion extending over the disk rotor so as to face the other of the pair of brake pads;
   an electric motor spaced apart from said claw portion and disposed in the vicinity of an end portion of said piston; and
   a ball ramp mechanism operable to convert rotation of said electric motor to a linear motion so as to reciprocally move said piston, to thereby enable application and removal of a braking force relative to the disk rotor by the pair of brake pads, said ball ramp mechanism being disposed between said claw portion and said electric motor, wherein
   said electric motor is coaxial with said ball ramp mechanism.

17. A motor-driven disk brake for applying and removing a braking force relative to a disk rotor by moving a first brake pad and a second brake pad disposed at opposite sides of the disk rotor, said motor-driven disk brake comprising:

a motor mechanism portion;

a power transmission mechanism portion connected to said motor mechanism portion, said power transmission mechanism portion being adapted to move the first and second brake pads by receiving power from said motor mechanism portion, said motor mechanism portion including an electric motor and a first case for covering said electric motor, said power transmission mechanism portion comprising a claw portion including a flange portion having an opening, and a ball ramp unit inserted into the opening of said flange portion, said ball ramp unit including a piston disposed so as to face the first brake pad, a ball ramp mechanism operable to convert rotation of a rotor of said electric motor to a linear motion so as to reciprocally move said piston, and a second case for accommodating said piston and said ball ramp mechanism as a unit, said claw portion being capable of extending over the disk rotor and facing the second brake pad when said ball ramp unit is inserted into the opening of said flange portion; and a transmission device operable to transmit power of said electric motor of said motor mechanism portion to said ball ramp mechanism of said power transmission mechanism portion when said power transmission mechanism portion and said motor mechanism portion are connected by engaging said first case with said claw portion, and wherein said electric motor is coaxial with said ball ramp mechanism.

* * * * *